United States Patent
Shiraishi

(10) Patent No.: US 8,786,821 B2
(45) Date of Patent: Jul. 22, 2014

(54) POLARIZATION CONTROLLER AND POLARIZATION MODE DISPERSION COMPENSATOR

(75) Inventor: Takashi Shiraishi, Kawasaki (JP)

(73) Assignee: Fujitsu Limited, Kawasaki-Shi (JP)

( * ) Notice: Subject to any disclaimer, the term of this patent is extended or adjusted under 35 U.S.C. 154(b) by 510 days.

(21) Appl. No.: 12/780,523

(22) Filed: May 14, 2010

(65) Prior Publication Data

US 2010/0296152 A1   Nov. 25, 2010

(30) Foreign Application Priority Data

May 20, 2009   (JP) .................................. 2009-122289

(51) Int. Cl.
*H04B 10/12*   (2006.01)
*H04J 14/02*   (2006.01)
*G02F 1/1335*  (2006.01)
*G02F 1/03*    (2006.01)

(52) U.S. Cl.
USPC ............... 349/196; 398/65; 398/81; 398/141; 398/147; 398/152; 398/159; 398/161; 398/200; 385/1; 385/2; 385/3; 359/249; 359/251; 349/17

(58) Field of Classification Search
USPC ............. 398/65, 81, 141–143, 147–150, 152, 398/158, 159, 161, 196, 200; 349/17; 385/1–3; 359/249, 251–256
See application file for complete search history.

(56) References Cited

U.S. PATENT DOCUMENTS

| | | | | |
|---|---|---|---|---|
| 4,762,397 | A | * | 8/1988 | Pepper ............................. 349/17 |
| 4,908,702 | A | * | 3/1990 | Chao et al. ..................... 349/17 |
| 5,963,291 | A | * | 10/1999 | Wu et al. ......................... 349/17 |
| 7,352,971 | B2 | * | 4/2008 | Roberts et al. ................ 398/147 |
| 2004/0131298 | A1 | | 7/2004 | Rasmussen et al. |
| 2005/0201758 | A1 | | 9/2005 | Isomura et al. |
| 2005/0244092 | A1 | | 11/2005 | Mimura et al. |
| 2006/0110092 | A1 | | 5/2006 | Ikeda |
| 2008/0151244 | A1 | * | 6/2008 | Okabe et al. .................. 356/364 |
| 2009/0279900 | A1 | * | 11/2009 | Frankel ........................ 398/152 |

FOREIGN PATENT DOCUMENTS

| | | |
|---|---|---|
| JP | 2005-502265 | 1/2005 |
| JP | 2005-260370 | 9/2005 |
| WO | 2004/013992 A1 | 2/2004 |
| WO | 2004/029699 A1 | 4/2004 |

OTHER PUBLICATIONS

H. Miao et al., "All-Order PMD Compensation via VIPA Based Pulse Shaper", OThG2.pdf, OFC/NFOEC 2008, 3 pp.

(Continued)

*Primary Examiner* — Evelyn A. Lester
(74) *Attorney, Agent, or Firm* — Staas & Halsey LLP

(57) ABSTRACT

A polarization controller includes a first polarization controller, a demultiplexer, a second polarization controller, and a multiplexer. The first polarization controller controls the state of polarization of input light such that a part of the wavelength components of the input light is in a first state of polarization. The demultiplexer demultiplexes the light output from the first polarization controller into a plurality of wavelength components. The second polarization controller controls the plurality of wavelength components in a second state of polarization by using liquid crystal modulation devices. The multiplexer multiplexes the plurality of wavelength components output from the second polarization controller.

13 Claims, 23 Drawing Sheets

(56) References Cited

OTHER PUBLICATIONS

H. Miao et al., "Feed-Forward Polarization-Mode Dispersion Compensation With Four Fixed Differential Group Delay Elements", *IEEE Photonics Technology Letters,* vol. 16, No. 4, Apr. 2004, pp. 1056-1058.

C. Xie et al., "Dynamic Performance and Speed Requirement of Polarization Mode Dispersion Compensators", *Journal of Lightwave Technology,* vol. 24, No. 11, Nov. 2006, pp. 3968-3975.

M. Doi et al., "8-Channel LiNbO$_3$ Polarization Controllers and Variable Differential Group Delay for PMD Compensation", IEICE General Conference, C-3-58, Mar. 2008, p. 239.

N. Hashimoto et al., "Small and High Accurate SOP Monitor Using Photonic Crystal Polarizer Array", IEICE General Conference, C-3-112, Mar. 2005, p. 282.

M. Akbulut et al., "Broadband All-Order Polarization Mode Dispersion Compensation Using Liquid-Crystal Modulator Arrays", *Journal of Lightwave Technology*, vol. 24, No. 1, Jan. 2006, pp. 251-261.

A. Rundquist et al., "Pulse shaping with the Gerchberg-Saxton algorithm", J. Opt. Soc. Am. B, vol. 19, No. 10, Oct. 2002, pp. 2468-2478.

H. Miao et al., "Broadband All-Order Polarization Mode Dispersion Compensation", OTuN2.pdf, OFC 2007, 3 pp.

T. Kubo et al., "Ultra compact Stokes polarimeter with high accuracy and fast response time", IEICE Communication Society Conference, B-10-37, 2004.

K. Ikeda et al., "Arbitrary and Endless Polarization Controller", Furukawa Review, No. 111, 2003, pp. 31-36.

* cited by examiner

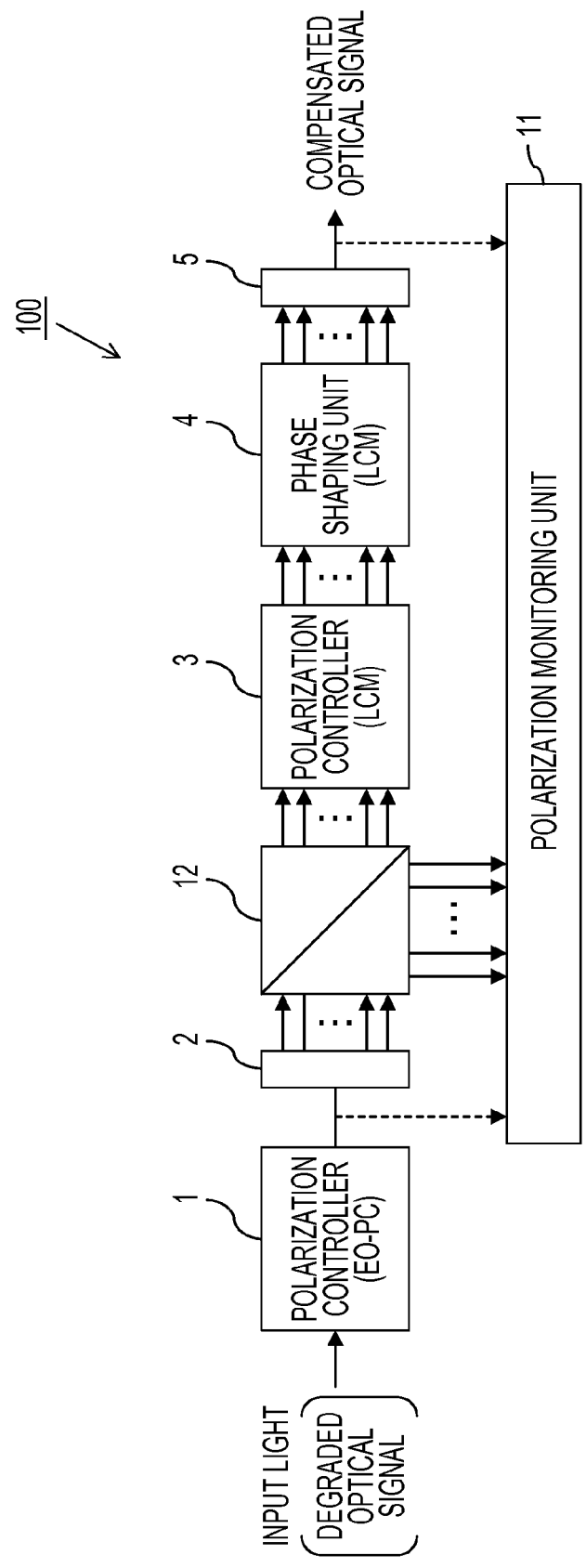

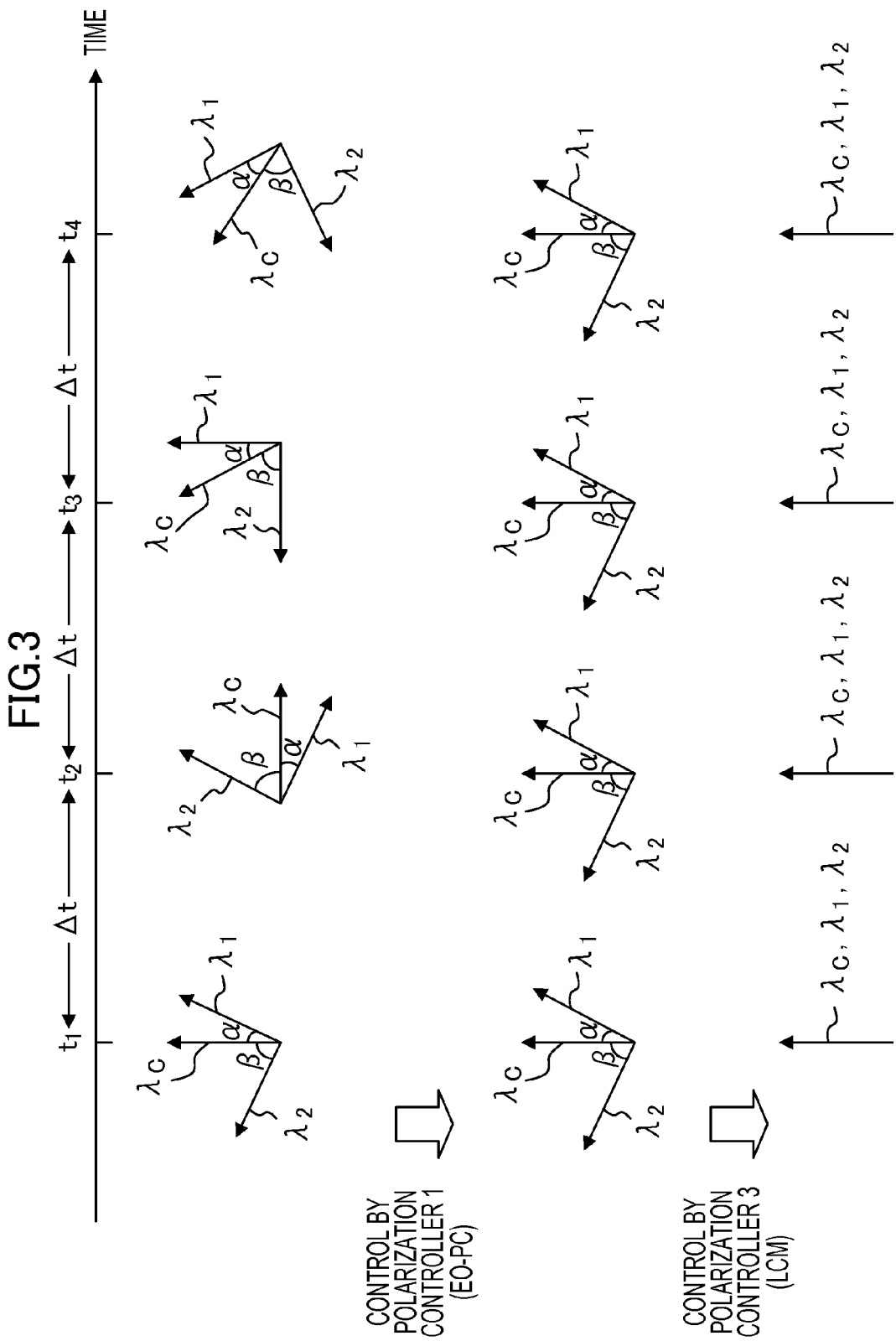

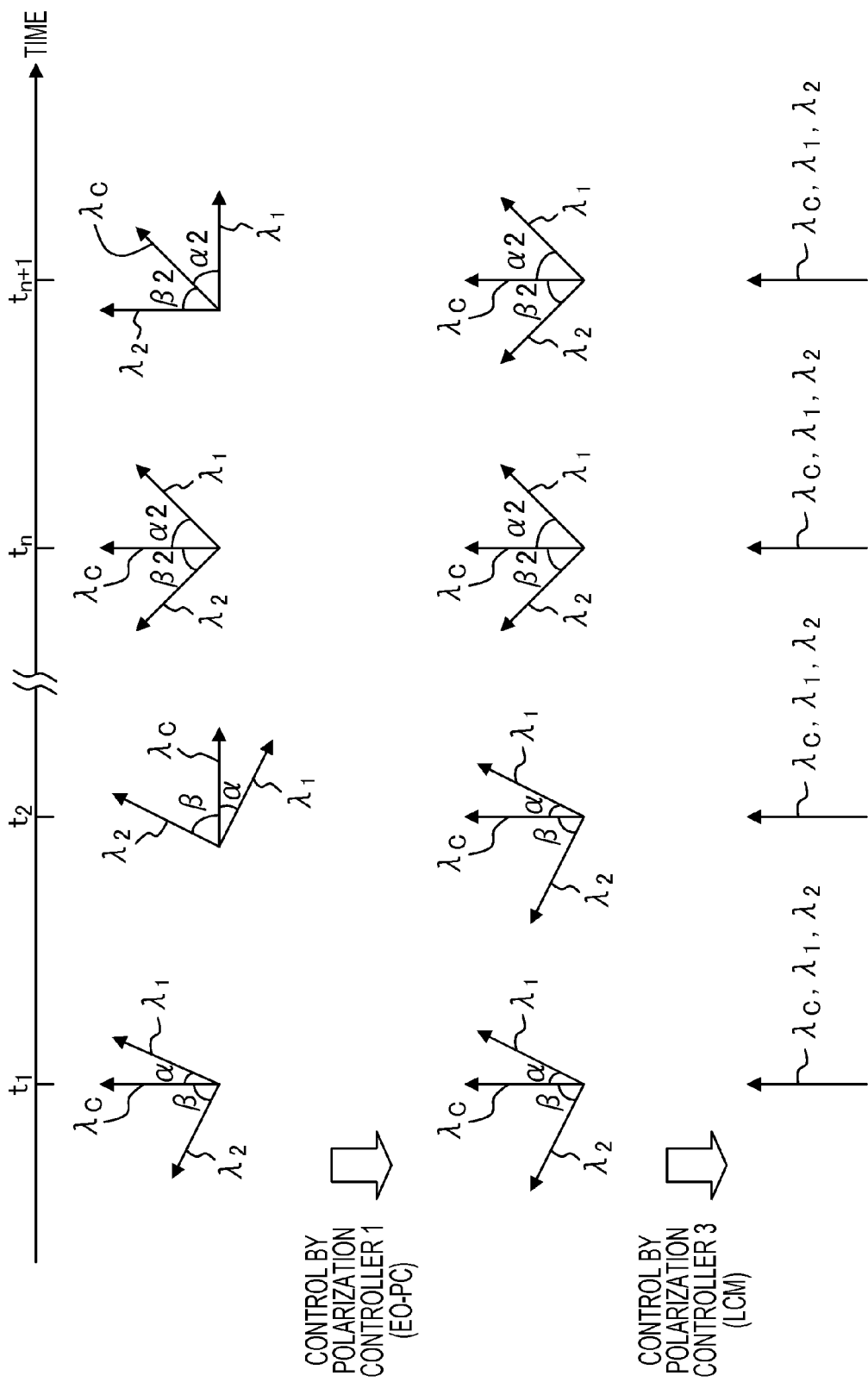

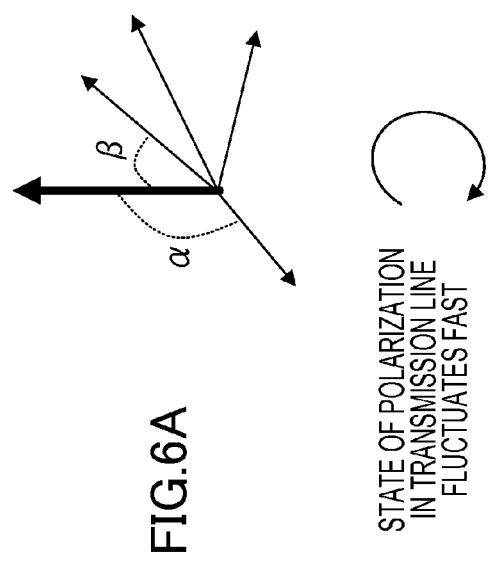
FIG.6A
FIG.6B
STATE OF POLARIZATION IN TRANSMISSION LINE FLUCTUATES FAST
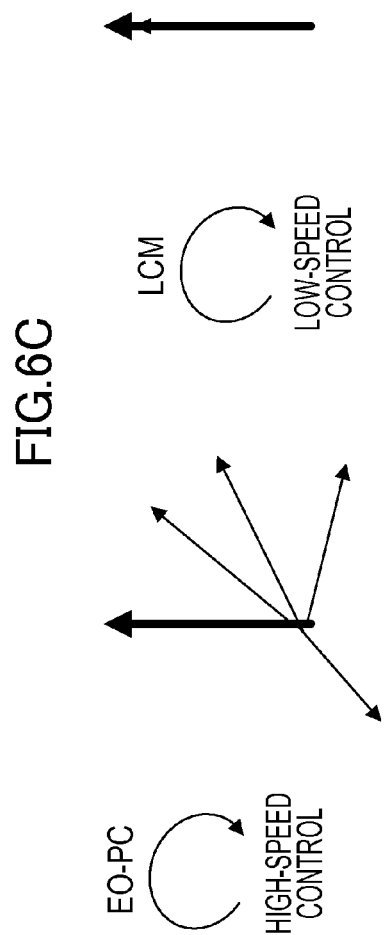
FIG.6C

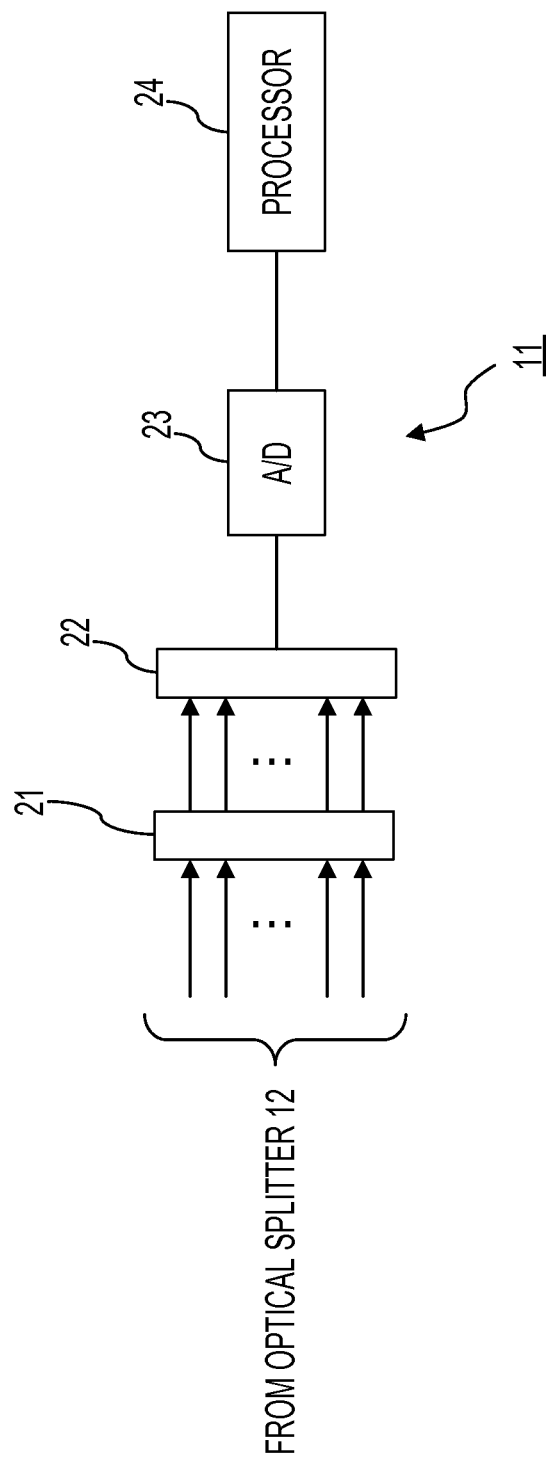

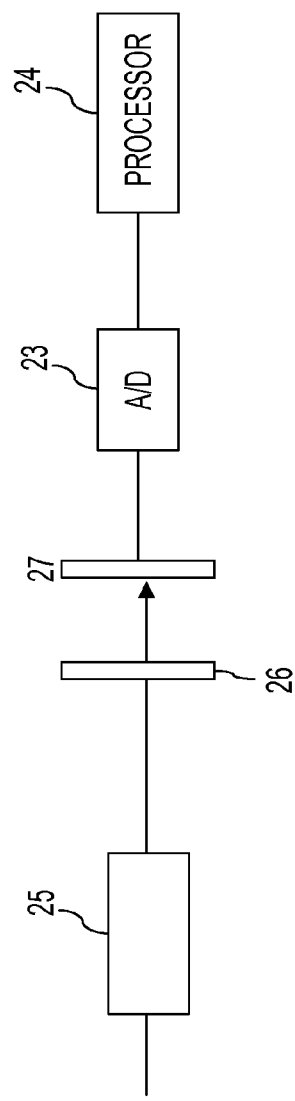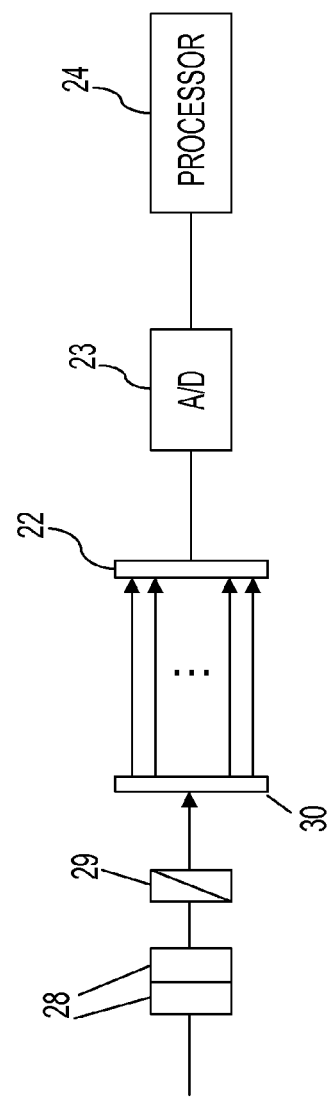

STATES OF POLARIZATION OF INPUT SIGNAL

STATES OF POLARIZATION OF OUTPUT SIGNAL

ENLARGED VIEW

A

B

TARGET SOP

POLARIZATION CONTROLLER AND POLARIZATION MODE DISPERSION COMPENSATOR

CROSS-REFERENCE TO RELATED APPLICATIONS

This application is related to and claims priority to Japanese Patent Application No. 2009-122289, filed on May 20, 2009, and incorporated herein by reference.

BACKGROUND

1. Field

The embodiments discussed herein are directed to a polarization controller and a polarization mode dispersion compensator.

2. Description of the Related Art

In recent years, along with the development of faster optical communication technologies, the transition rates are increasing, e.g., from 10 Gbit/s systems to 40 Gbit/s systems has been in progress. Therefore, it is important to develop an optical device used in a communication system having a transmission rate exceeding 40 Gbit/s.

An increase in the transmission rate in optical communication causes an issue of degradation of the signal waveform due to the polarization mode dispersion (PMD). The polarization mode dispersion refers to the phenomenon of a delay occurring between two mutually perpendicular modes in an optical fiber (DGD: Differential Group Delay) due to a birefringence factor attributed to the ovalization of the core or the internal stress in the optical fiber. In general, the polarization mode dispersion in the optical fiber is proportional to the square root of the distance. Further, the allowable value of the polarization mode dispersion is inversely proportional to the bit rate. In long-distance high-speed transmission, therefore, a function of compensating for the polarization mode dispersion is required.

As a configuration for compensating for the polarization mode dispersion, a PMD compensator has been proposed which includes a polarization controller and a DGD compensator. This configuration compensates for the first-order polarization mode dispersion, but is incapable of compensating for the second- and higher-order polarization mode dispersion (e.g., Japanese Laid-open Patent Publication No. 2005-260370).

As another configuration for compensating for the polarization mode dispersion, a polarization mode dispersion compensator has been proposed which includes a compensation unit including a first polarization controller and a group delay time difference providing unit, a second polarization controller, and a control unit. The group delay time difference providing unit provides a group delay time difference to the light output from the first polarization controller. The second polarization controller converts the state of polarization of the light output from the compensation unit into linear polarization. The control unit controls the compensation unit and the second polarization controller to minimize the intensity of the polarized light perpendicular to the linearly polarized light output from the second polarization controller. However, even this configuration is unable to completely compensate for the second-order polarization mode dispersion (e.g., International Publication Pamphlet No. WO 2004/013992).

As still another configuration for compensating for the polarization mode dispersion, a PMD compensator has been proposed which includes a demultiplexer and a liquid crystal modulation device. The liquid crystal modulation device separately controls the respective polarizations of frequency components. Therefore, the first-order polarization mode dispersion and higher-order polarization mode dispersion are appropriately controlled. In general, however, a liquid crystal modulation device has a low response speed. If the state of polarization in a transmission line quickly fluctuates, therefore, the polarization mode dispersion is not sufficiently compensated (e.g., H. Miao et al., "All-Order PMD Compensation via VIPA Based Pulse Shaper," OFC2008 OThG2 2008).

As the related art, the following patent documents and non-patent documents have also been proposed: Japanese National Publication of International Patent Application No. 2005-502265; International Publication Pamphlet No. WO 2004/029699; H. Miao et al., "Feed-Forward Polarization-Mode Dispersion Compensation with Four Fixed Differential Group Delay Elements," IEEE Photonics Technology Letters Vol. 16, No. 4, April 2004, pages 1056 to 1058; and C. Xie et al., "Dynamic Performance and Speed Requirement of Polarization Mode Dispersion Compensators," Journal of Lightwave Technology, Vol. 24, No. 11, November 2006, pages 3968 to 3975.

However, conventional techniques are unable to sufficiently compensate for high-order polarization mode dispersion, for example, if the state of polarization quickly changes.

SUMMARY

It is an aspect of the embodiments discussed herein to provide a polarization controller, a polarization mode dispersion compensator, and a polarization control method.

The above aspects can be attained by a polarization controller including a first polarization controller, a demultiplexer, a second polarization controller, and a multiplexer. The first polarization controller controls the state of polarization of input light such that a part of the wavelength components of the input light is in a first state of polarization. The demultiplexer demultiplexes the light output from the first polarization controller into a plurality of wavelength components. The second polarization controller controls the plurality of wavelength components in a second state of polarization by using liquid crystal modulation devices. The multiplexer multiplexes the plurality of wavelength components output from the second polarization controller.

The above aspects can be attained by a polarization mode dispersion compensator including a first polarization controller to control the state of polarization of input light such that a part of the wavelength components of the input light is in a first state of polarization, a demultiplexer to demultiplex the light output from the first polarization controller into a plurality of wavelength components, a second polarization controller to control the plurality of wavelength components in a second state of polarization by using liquid crystal modulation devices, a phase controller to control the respective phases of the wavelength components, the respective states of polarization of which are controlled by the second polarization controller, and a multiplexer to multiplex the plurality of wavelength components output from the phase controller.

The above aspects can be attained by a polarization control method including causing a first polarization controller to control the state of polarization of input light such that a part of the wavelength components of the input light is in a first state of polarization; demultiplexing the light output from the first polarization controller into a plurality of wavelength components, causing a second polarization controller including liquid crystal modulation devices to control the plurality of wavelength components in a second state of polarization, and multiplexing the plurality of wavelength components output from the second polarization controller.

The object and advantages of the various embodiments will be realized and attained by elements and combinations particularly pointed out in the claims. It is to be understood that both the foregoing general description and the following detailed description are exemplary and explanatory and are not restrictive of the various embodiments, as claimed. These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates a configuration of a polarization mode dispersion compensator according to a first embodiment;

FIG. 3 illustrates a method of controlling the state of polarization;

FIG. 4 illustrates a method of controlling the state of polarization;

FIGS. 6A to 6C illustrate polarization conversions performed by polarization controllers;

FIG. 9 illustrates an embodiment of a polarization monitoring unit;

FIGS. 11A and 11B illustrate configurations of the polarization monitoring unit;

DETAILED DESCRIPTION OF THE EMBODIMENTS

Figure 2A:
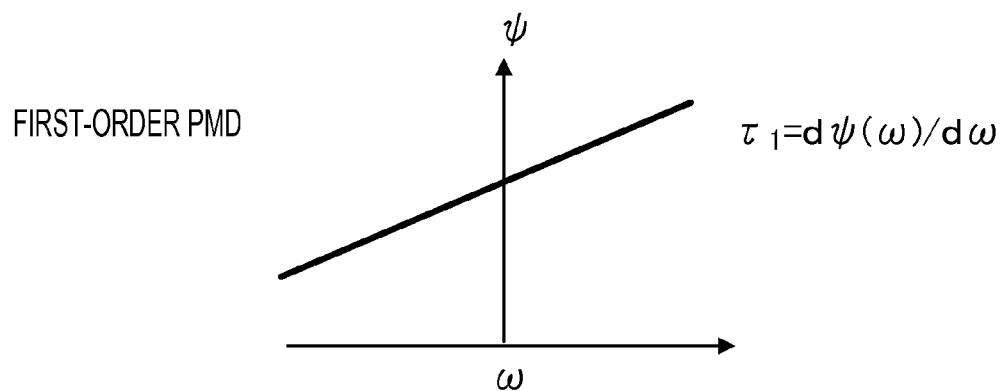
FIGS. 2A and 2B are diagrams illustrating first-order polarization mode dispersion and second-order polarization mode dispersion, respectively.

FIG. 1 illustrates a configuration of a polarization mode dispersion compensator according to a first embodiment. A polarization mode dispersion compensator 100 according to a first embodiment may be provided to, for example, an optical relay station or an optical receiving station of an optical communication system, and is connected to an optical fiber transmission line which transmits optical signals. Optical signals degraded through the optical fiber transmission line may be input to the polarization mode dispersion compensator 100.

The polarization mode dispersion compensator 100 includes a polarization controller (EO-PC) 1, a demultiplexer 2, a polarization controller (LCM) 3, a phase shaping unit 4, and a multiplexer 5. The polarization controller 1 controls the state of polarization of input light. The demultiplexer 2 demultiplexes the light output from the polarization controller 1 into a plurality of wavelength components. The polarization controller 3 controls the respective states of polarization of the plurality of wavelength components by using liquid crystal modulation devices. The phase shaping unit 4 controls the respective phases of the wavelength components, the respective states of polarization of which are controlled by the polarization controller 3. The multiplexer 5 multiplexes the plurality of wavelength components, the respective states of polarization and phases of which are controlled.

The polarization controller 1 controls the state of polarization of the input light such that a part of the wavelength components of the input light is in a first state of polarization. The respective states of polarization of the wavelength components of the input light may be collectively controlled. Further, the polarization controller 3 controls the plurality of wavelength components obtained by the demultiplexer 2 in a second state of polarization. That is, the respective states of polarization of the wavelength components of the optical signal may be equalized to one another. The phase shaping unit 4 controls the respective phases of the wavelength components to compensate for the polarization mode dispersion. In this case, the respective states of polarization of the wavelength components are equal. Therefore, the polarization mode dispersion is accurately compensated.

The polarization mode dispersion compensator 100 having the above configuration operates as a polarization controller, if the phase shaping unit 4 is removed therefrom. In this case, the multiplexer 5 multiplexes the plurality of wavelength components output from the polarization controller 3.

The polarization mode dispersion compensator 100 may be configured to further include a polarization monitoring unit 11 which monitors the respective states of polarization of the plurality of wavelength components. The polarization monitoring unit 11 includes a processor unit, such as a DSP (Digital Signal Processor), and calculates the respective Stokes parameters of the wavelength components, for example. In this case, an optical splitter 12 may be provided between the demultiplexer 2 and the polarization controller 3. The optical splitter 12 divides the plurality of wavelength components obtained by the demultiplexer 2, and guides the divided wavelength components to the polarization monitoring unit 11. The polarization monitoring unit 11 may monitor the state of polarization of the optical signal tapped from an optical path extending between the polarization controller 1 and the demultiplexer 2 or the state of polarization of the optical signal tapped from an optical path extending from the output side of the multiplexer 5. Further, the polarization controllers 1 and 3 control the states of polarization in accordance with the result of the monitoring performed by the polarization monitoring unit 11.

Compensation for the polarization mode dispersion performed by the polarization mode dispersion compensator 100 is disclosed. It may be assumed herein that the polarization controller 1 is absent. In the frequency space, the optical signal transmitted through the optical fiber transmission line may be degraded due to the disturbance of the polarization mode state and the disturbance of the phase. Therefore, the optical signal degraded due to the polarization mode dispersion may be represented by the following equation (1):

$$Eout(\omega)=Ein(\omega)\{a(\omega)x+b(\omega)y\} \quad (1),$$

wherein "$Ein(\omega)$" represents an optical electric field before being degraded by the polarization mode dispersion, "$Eout(\omega)$" represents an optical electric field degraded by the polarization mode dispersion, "x" and "y" represent x-polarization and y-polarization, respectively, and "$a(\omega)$" and "$b(\omega)$" include the information of the intensity and phase of the an x-polarization component and the information of the intensity and phase of a y-polarization component, respectively.

The polarization controller 3 performs a polarization control on the wavelength components (i.e., frequency components) of the degraded optical signal. In this case, the polarization controller 3 performs the polarization control such that the respective states of polarization of the frequency components are equal to one another. Respective states of polarization of the frequency components may be equalized, for example, in the x-direction. Accordingly, the optical signal $Eout2(\omega)$ output from the polarization controller 3 may be represented by the following equation (2):

$$Eout2(\omega)=Ein(\omega)\exp(-j\psi(\omega))x \quad (2).$$

The optical signal output from the polarization controller 3 includes a term "$\psi(\omega)$" representing the phase which varies depending on the frequency, and thus the waveform of the optical signal is still degraded. Therefore, the phase shaping unit 4 compensates for the phase difference depending on the frequency. That is, the phase shaping unit 4 controls the respective phases of the frequency components to be equal to one another. As a result, the optical signal $Eout3(\omega)$ output from the phase shaping unit 4 may be represented by the following equation (3):

$$Eout3(\omega)=Ein(\omega)x \quad (3).$$

Figure 2B:
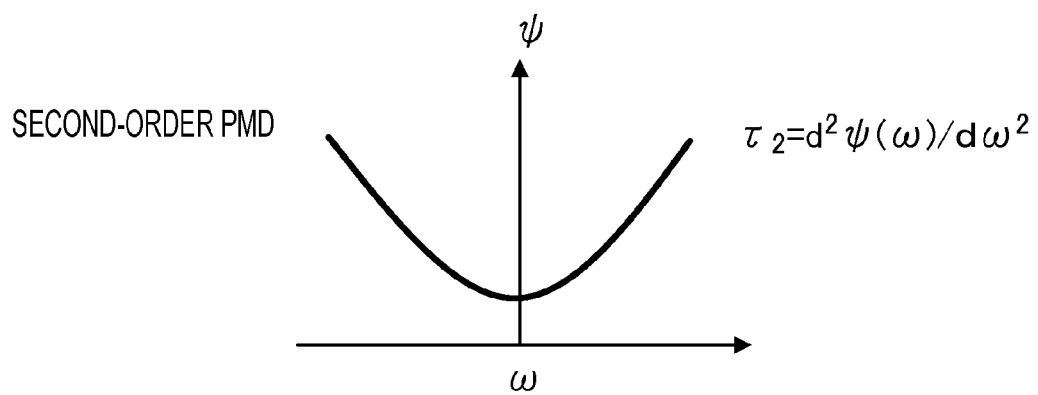

The phase "$\psi(\omega)$" adjusted by the phase shaping unit 4 is correlated with the first- and higher-order polarization mode dispersion, and may be approximately represented by the following equation (4):

$$\psi(\omega)=\tau_1\omega+0.5\tau_2\omega^2+ \quad (4),$$

wherein $\tau_1$ and $\tau_2$ represent the absolute value of the first-order polarization mode dispersion and the absolute value of the second-order polarization mode dispersion, respectively. The first-order polarization mode dispersion and the second-order polarization mode dispersion are illustrated in FIGS. 2A and 2B, respectively.

In the polarization mode dispersion compensator 100 according to the embodiment, the polarization controller 3 including the liquid crystal modulation devices equalizes the respective states of polarization of the frequency components, and thereafter the phase shaping unit 4 equalizes the respective phases of the frequency components. Herein, the first- and higher-order polarization mode dispersion is correlated with the phase controlled by the phase shaping unit 4. Therefore, the first- and higher-order polarization mode dispersion is completely compensated.

However, the polarization controller 3 uses the liquid crystal modulation devices, and may have a low response speed. If the polarization in the transmission line quickly fluctuates, therefore, the liquid crystal modulation devices of the polarization controller 3 may fail to follow the fluctuation of the polarization, and thus may be are unable to equalize the respective states of polarization of the frequency components.

While the state of polarization in the transmission line quickly fluctuates, the wavelength dependence of the state of polarization changes slowly. That is, in a sufficiently short time, there is no substantial change in the wavelength dependence of the state of polarization in the transmission line. With the use of this characteristic, the polarization mode dispersion compensator 100 according to the embodiment controls the state of polarization.

Figure 5:
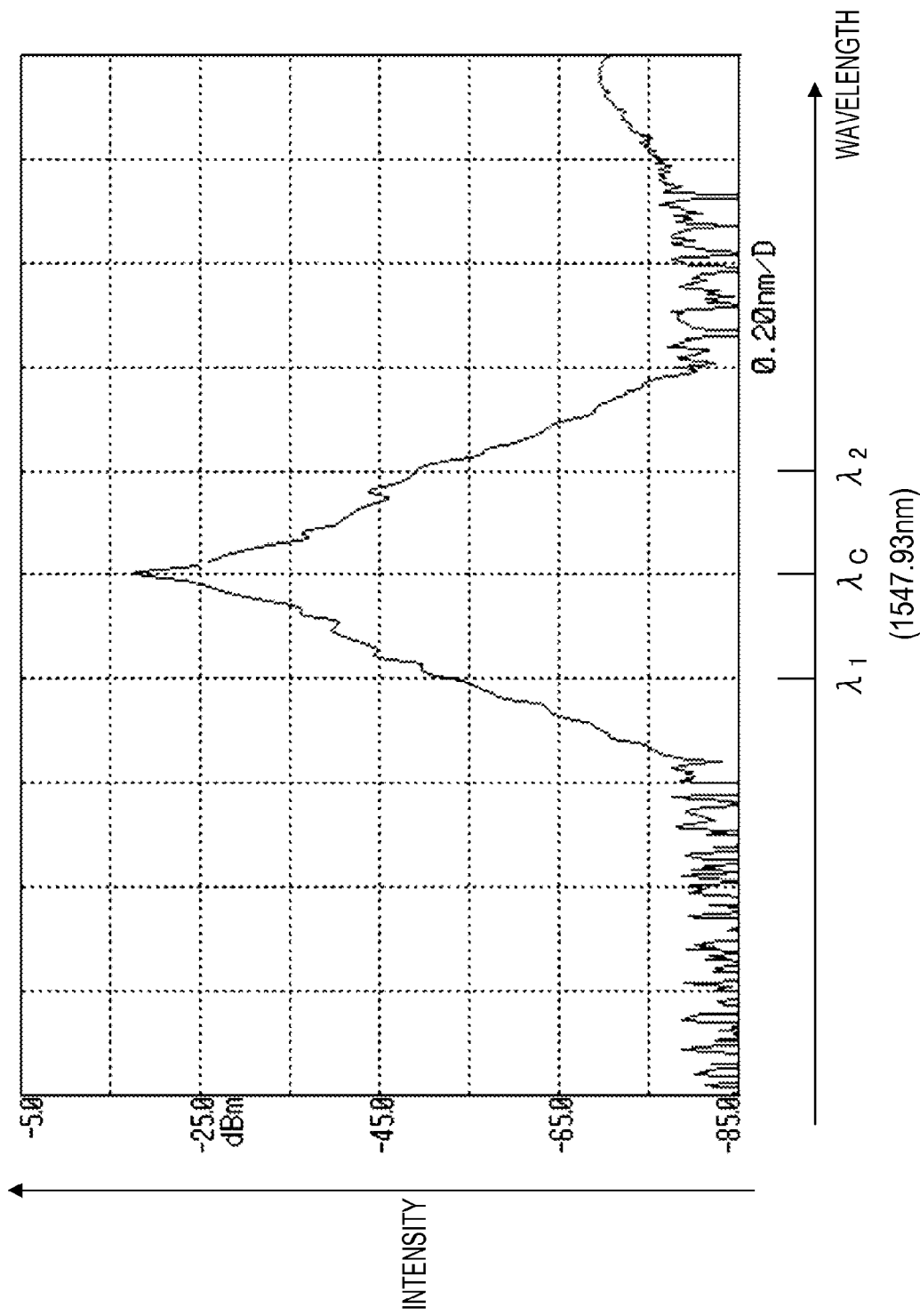
FIG. 5 illustrates the spectrum of an optical signal.

FIGS. 3 and 4 are diagrams for explaining a method of controlling the state of polarization in the polarization mode dispersion compensator 100. It is assumed herein that the optical signal input to the polarization mode dispersion compensator 100 has a predetermined frequency range, as illustrated in FIG. 5. This optical signal corresponds to, for example, a channel of a WDM (Wavelength Division Multiplexing) signal. Further, the demultiplexer 2 demultiplexes the optical signal into a plurality of wavelength components. In the following, three wavelength components $\lambda c$, $\lambda 1$, and $\lambda 2$ will be described for ease of explanation. The wavelength component $\lambda c$ corresponds to the central wavelength of the optical signal. Further, the wavelength component $\lambda 1$ is shorter than the wavelength component $\lambda c$, and the wavelength component $\lambda 2$ is longer than the wavelength component $\lambda c$.

The respective arrows in FIGS. 3 and 4 indicate the respective states of polarization of the corresponding wavelength components in the Poincare space. That is, if the state of polarization varies, the orientation of the corresponding arrow also varies.

The polarization mode dispersion in the transmission line depends on the wavelength. Therefore, the respective states of polarization of the wavelength components of the input optical signal are different from one another. In the example illustrated in FIG. 3, the respective states of polarization of the wavelength components at a time t1 are as follows. The wavelength component $\lambda c$ is oriented at an angle of 0°, the wavelength component $\lambda 1$ is shifted from the wavelength component $\lambda c$ by a value of $\alpha$, and the wavelength component $\lambda 2$ is shifted from the wavelength component $\lambda c$ by a value of $-\beta$.

Further, the state of polarization in the transmission line fluctuates every moment. In the example illustrated in FIG. 3, the respective states of polarization of the wavelength components at a time t2 are as follows. The wavelength component $\lambda c$ is oriented at an angle of 90°, the wavelength component $\lambda 1$ is shifted from the wavelength component $\lambda c$ by a value of $\alpha$, and the wavelength component $\lambda 2$ is shifted from the wavelength component $\lambda c$ by a value of $-\beta$. Further, the state of polarization also changes at times t3, t4, and so forth.

In a sufficiently short time, however, there is no substantial change in the wavelength dependence of the state of polarization in the transmission line. That is, if a value $\Delta t$ is sufficiently small (e.g., less than 1 ms) in FIG. 3, the difference in the state of polarization between the wavelengths does not change. At times time t1 to t4 in this embodiment, the difference in the state of polarization between the wavelength components λc and λ1 continues to be the value α, and the difference in the state of polarization between the wavelength components λc and λ2 continues to be the value β.

The polarization controller 1 collectively controls the respective states of polarization of the input optical signal. In this case, the polarization controller 1 collectively controls the states of polarization of the optical signal such that the wavelength component λc is polarized at an angle of 0°, for example. Thereby, the state of polarization of the optical signal output from the polarization controller 1 is constant at the times t1 to t4. That is, the respective states of polarization of the wavelength components at the times t1 to t4 are as follows. The wavelength component λc is oriented at an angle of 0°, the wavelength component λ1 is shifted from the wavelength component λc by a value of α, and the wavelength component λ2 is shifted from the wavelength component λc by a value of –β.

The polarization controller 1 is, for example, a waveguide polarization controller using the electro-optical effect, and has a substantially high response speed. Therefore, even if the state of polarization in the transmission line changes at the times t1 to t4 illustrated in FIG. 3, the change can be compensated. That is, the polarization controller 1 is capable of controlling the polarization of the optical signal in a predetermined state.

The optical signal, the state of polarization of which is controlled by the polarization controller 1, is demultiplexed into a plurality of wavelength components by the demultiplexer 2, and is guided to the polarization controller 3. The polarization controller 3 controls the state of polarization for each of the wavelength components.

The polarization controller 3 equalizes the respective states of polarization of the wavelength components λc, λ1, and λ2. In the embodiment illustrated in FIG. 3, the polarization controller 3 controls the wavelength components λc, λ1, and λ2 to be polarized at an angle of 0°. In this case, the polarization controller 3 performs the following control on the wavelength components: shifting the wavelength component λc by a value of 0, shifting the wavelength component λ1 by a value of –α, and shifting the wavelength component λ2 by a value of –β.

The polarization controller 3 uses the liquid crystal modulation devices, as described above, and thus has a low response speed. In the polarization mode dispersion compensator 100 according to the embodiment, however, in a sufficiently short time as compared with the response time of the liquid crystal modulation devices, the respective polarizations of the wavelength components of the optical signal are controlled in a predetermined state by the polarization controller 1. In this short time, therefore, the polarization controller 3 can perform a predetermined control on the wavelength components.

In the example illustrated in FIG. 4, the wavelength dependence characteristic of the state of polarization changes during the period from the time t2 to a time tn. For example, the respective states of polarization of the wavelength components at the time tn are as follows. The wavelength component λc is oriented at an angle of 0°, the wavelength component λ1 is shifted from the wavelength component λc by a value of α2, and the wavelength component λ2 is shifted from the wavelength component λc by a value of –β2. The period from the time t2 to the time tn is assumed to be sufficiently long as compared with the response time of the liquid crystal modulation devices.

That is, in the period from the time t1 to the time tn in this embodiment, the difference in the state of polarization between the wavelength components λc and λ1 slowly changes from the value "α" to the value "α2," and the difference in the state of polarization between the wavelength components λc and λ2 slowly changes from the value "β" to the value "β2."

Similarly, the polarization controller 1 collectively controls the states of polarization of the optical signal such that the wavelength component λc is polarized at an angle of 0°. The polarization controller 3 equalizes the respective states of polarization of the wavelength components. That is, the polarization controller 3 performs the following control on the wavelength components at the time tn: shifting the wavelength component λc by a value of 0, shifting the wavelength component λ1 by a value of –α2, and shifting the wavelength component λ2 by a value of +β2.

As described above, the polarization control performed by the polarization controller 3 at the time tn is different from the polarization control performed at the time t1. However, the period from the time t1 to the time tn is sufficiently long as compared with the response time of the liquid crystal modulation devices. In the period from the time t1 to the time tn, therefore, the polarization controller 3 is capable of gradually changing the respective states of the liquid crystal modulation devices from "the value 0 for the wavelength component λc, the value –α for the wavelength component λ1, and the value +β for the wavelength component λ2" to "the value 0 for the wavelength component λc, the value –α2 for the wavelength component λ1, and the value +β2 for the wavelength component λ2." In the polarization mode dispersion compensator 100 according to the embodiment, therefore, it is possible to equalize the respective states of polarization of the wavelength components, even if the wavelength dependence of the state of polarization in the transmission line fluctuates.

FIGS. 6A-6C illustrate the polarization conversions performed by the polarization controllers 1 and 3. The polarization controller (EO-PC) 1 collectively controls the respective polarizations of the wavelengths. Therefore, the correlation between the wavelengths is maintained. Therefore, if the polarization control is performed with the use of the polarization controller (EO-PC) 1, it is possible to bring the state of polarization of the input optical signal back to the state thereof before the fluctuation in the transmission line. Therefore, the polarization controller (LCM) 3, which adjusts the correlation between the wavelengths, can perform a low-speed control.

Components included in the polarization mode dispersion compensator 100 are disclosed.

The polarization controller 1 is, for example, a waveguide polarization controller formed by the use of an LN (LiNbO3) substrate. An LN waveguide polarization controller has a response speed of approximately 100 ns, and thus can follow the fluctuation in the state of polarization in the transmission line. The LN waveguide polarization controller is not particularly limited, but may be realized by, for example, the cascade connection of a quarter-wave plate, a half-wave plate, and a quarter-wave plate, the respective optical axes of which are adjusted by voltage driving. In this case, a desired state of polarization is obtained by the adjustment of respective drive voltages applied to the wave plates. A polarization controller having the above configuration is described in, for example, the following document: Masaharu Doi et al., "8-Channel LiNbO3 Waveguide Polarization Controllers and Variable DGD Optical Circuits for PMDC," 2008 IEICE (The Institute of Electronics, Information and Communication Engineers) General Conference, C-3-58, 2008.

The polarization controller 1 is not limited to the LN waveguide polarization controller. For example, a high-speed polarization controller having a response speed of 1 ms or less and capable of collectively controlling the states of polarization of an optical signal having a predetermined spectrum width can be used. That is, for example, the polarization controller 1 may be realized by a bulk electro-optical polarization controller using a crystal having the electro-optical effect (e.g., PLZT). Further, the polarization controller 1 may be realized by a configuration using the magneto-optical effect (e.g., Faraday rotator).

The demultiplexer 2 demultiplexes the input light into a plurality of wavelength components. The demultiplexer 2 is not particularly limited, but is realized by the use of, for example, a diffraction grating or a VIPA (Virtually Imaged Phased-Array).

The polarization controller 3 is a plane-type polarization controller including the liquid crystal modulation devices. Further, the polarization controller 3 is realized by, for example, the integration of two or more layers of matrix phase modulation devices using nematic liquid crystal. In this case, if the respective orientations of two layers of liquid crystal are set to angles of 0° and 90°, respectively, for example, it is possible to obtain all states of polarization on the Poincare sphere. Further, to achieve infinite follow-up in the polarization control, a configuration using three or four layers of liquid crystal modulation devices is desirable. The phase shaping unit 4 is realized by the use of one or more layers of matrix phase modulation devices using nematic liquid crystal.

Figure 7A:
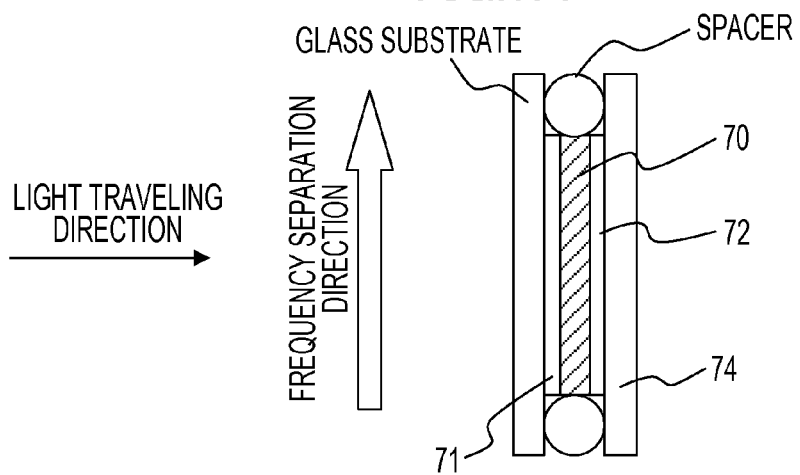
FIGS. 7A to 7C illustrate a matrix phase modulation device.
Figure 7B:
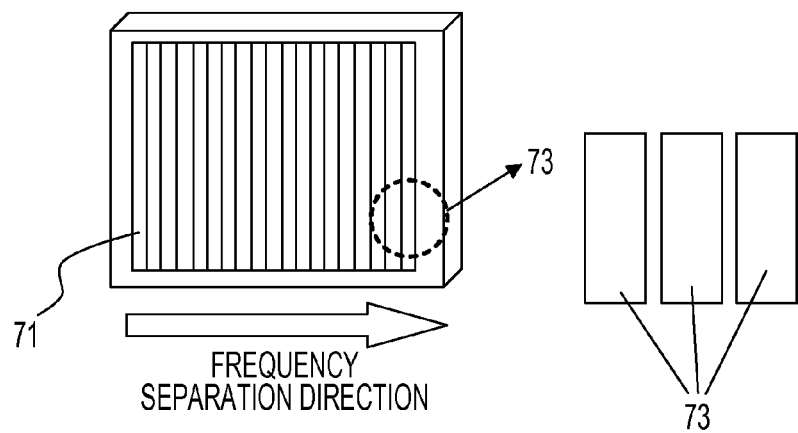
Figure 7C:
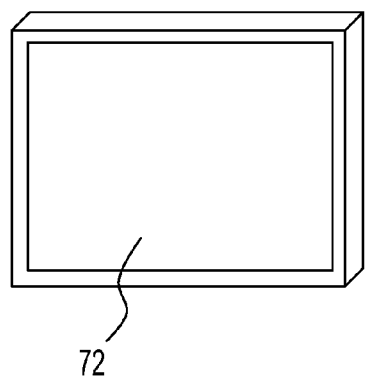

FIGS. 7A to 7C illustrate a matrix phase modulation device serving as the polarization controller 3 or the phase shaping unit 4. Herein, one layer of the matrix phase modulation device is illustrated. FIG. 7B is a front side view and FIG. 7C is back side view.

The matrix phase modulation device may be formed by input-side electrodes, liquid crystal cells, and an output-side electrode provided between a pair of glass substrates 74. Herein, the liquid crystal cells are provided between the input-side electrodes and the output-side electrode. Further, each of the input-side electrodes and the output-side electrode is a transparent electrode.

The matrix phase modulation device includes a plurality of liquid crystal cells 70. Herein, if the optical signal is demultiplexed into wavelength components λ1 to λn by the demultiplexer 2, the matrix phase modulation device includes liquid crystal cells C1 to Cn corresponding to the wavelength components λ1 to λn. Further, the plurality of liquid crystal cells may be arranged in the frequency separation direction. The frequency separation direction refers to the distribution direction of the light divided by demultiplexing in the frequency space. Further, the wavelength components λ1 to λn are guided to the respective corresponding liquid crystal cells C1 to Cn.

Each of the liquid crystal cells may be provided with an input-side electrode 71 (electrode pixel 73). The output-side electrode 72 may be shared by the plurality of liquid crystal cells. Further, with the control of the drive voltage applied to the electrode pixel, the orientation of the corresponding liquid crystal cell can be adjusted. Herein, the respective drive voltages applied to the electrode pixels can be controlled independently from one another. With the use of the respective drive voltages applied to the electrode pixels, therefore, the liquid crystal cells are capable of adjusting the phase of light independently from one another. That is, each of the electrode pixels functions as an independent phase adjuster (retardation plate). In general, a liquid crystal cell is capable of adjusting a phase greater than $2\pi$ by adjusting the voltage.

Figure 8B:
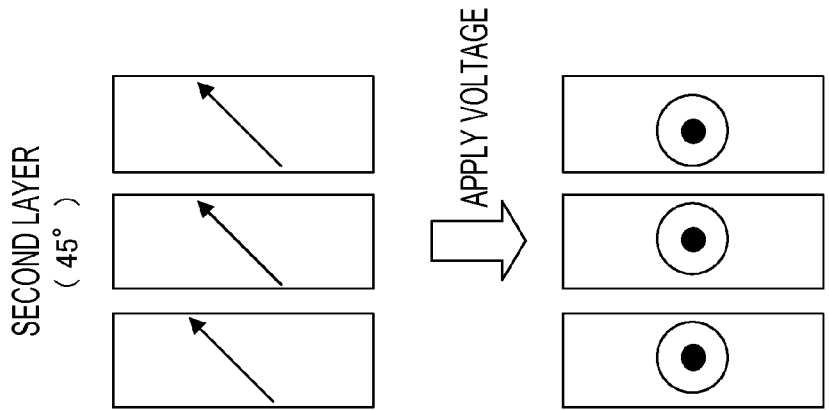
FIGS. 8A and 8B illustrate an orientation of liquid crystal in the matrix phase modulation device.
Figure 8A:
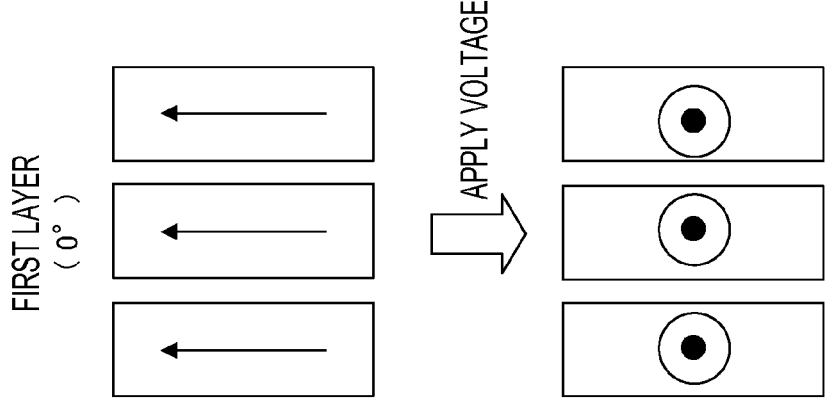

FIGS. 8A and 8B illustrate orientations of liquid crystal in the matrix phase modulation device. Liquid crystal includes molecules oriented in the long axis direction, and has a birefringence index in the orientation direction thereof (the direction indicated by the arrows). In the embodiment illustrated in FIGS. 8A and 8B, when the value of the drive voltage is zero, the liquid crystal cells in the modulation device of the first layer are oriented at an angle of 0°, and the liquid crystal cells in the modulation device of the second layer are oriented at an angle of 45°. Further, as the drive voltage is increased, the liquid crystal cells of the first and second layers are more oriented toward a direction perpendicular to the drawing plane of FIGS. 8A and 8B. That is, each of the liquid crystal cells of the first layer functions as a 0° phase adjuster, and each of the liquid crystal cells of the second layer functions as a 45° phase adjuster.

The polarization controller 3 includes two or more layers of matrix phase modulation devices, and appropriately controls the respective drive voltages applied to the liquid crystal cells of the layers, through which the wavelength components pass. Accordingly, the polarization controller 3 is capable of adjusting the polarization of each of the wavelength components to a desired state. Further, the phase shaping unit 4 includes one or more layers of matrix phase modulation devices, and appropriately controls the respective drive voltages applied to the liquid crystal cells of the layers, through which the wavelength components pass. Accordingly, the phase shaping unit 4 is capable of adjusting the phase of each of the wavelength components to a desired state.

FIG. 9 illustrates an embodiment of the polarization monitoring unit 11. The wavelength components λ1 to λn divided by the optical splitter 12 are input to the polarization monitoring unit 11. The polarization monitoring unit 11 monitors the respective states of polarization of the wavelength components.

The polarization monitoring unit 11 includes an integrated polarizing plate array 21, a PD (Photodiode) array 22, an ND (Analog-to-Digital) converter 23, and a processor 24. The integrated polarizing plate array 21 includes a plurality of integrated polarizing plates, to which the wavelength components λ1 to λn are input. Each of the integrated polarizing plates is not particularly limited, but includes, for example, four polarizers (0°, 45°, 90°, and 45° polarizers), with a quarter-wave plate provided to the input side of one of the 45° polarizers. With this configuration, it is possible to observe four polarization intensities for each of the wavelength components λ1 to λn. The integrated polarizing plate is described in, for example, the following document: Naoki Hashimoto et al., "Small and Highly Accurate Photonic Crystal Polarization Monitor," 2005 IEICE General Conference, C-3-112, 2005.

The PD array 22 may be provided on the output side of the integrated polarizing plate array 21, and includes a plurality of light receiving elements for converting the wavelength components λ1 to λn into electrical signals. The light receiving elements are photodiodes, for example. The A/D converter 23 converts the electrical signals output from the PD array 22 into digital data. The digital data represents four polarizations (e.g., 0°, 45°, 90°, and circular polarizations) of the wavelength components λ1 to λn.

Based on the digital data obtained by the ND converter 23, the processor 24 calculates the Stokes parameters of the wavelength components λ1 to λn. The Stokes parameters represent the state of polarization of the optical signal. That is, the processor 24 detects the respective states of polarization of the wavelength components λ1 to λn by using the Stokes parameters.

Figure 10:
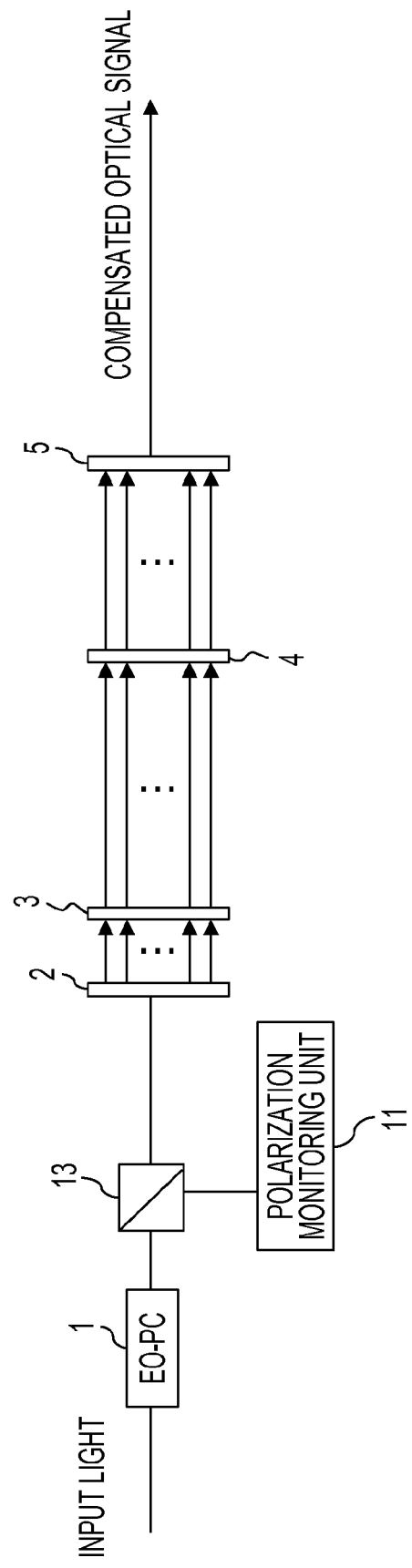
FIG. 10 illustrates a polarization mode dispersion compensator.

The wavelength components λ1 to λn output from the demultiplexer 2 may be divided by the optical splitter 12 and guided to the polarization monitoring unit 11. The configuration may be modified such that the optical signal divided on the input side of the demultiplexer 2 is guided to the polarization monitoring unit 11, as illustrated in FIG. 10. In this case, an optical splitter 13 may be provided between the polarization controller 1 and the demultiplexer 2, divides the optical signal, the polarization of which is controlled by the polarization controller 1, and guides the divided optical signal to the polarization monitoring unit 11.

In this case, the polarization monitoring unit 11 may be configured to include a demultiplexer equivalent to the demultiplexer 2. That is, the optical signal divided by the optical splitter 13 is demultiplexed into the wavelength components λ1 to λn in the polarization monitoring unit 11. In general, the beam of light waves obtained by a demultiplexer is spread. Therefore, the configuration including a demultiplexer inside the polarization monitoring unit 11 suppresses the spread of the beam, and thus is capable of more accurately monitoring the respective states of polarization of the wavelength components.

If the polarization monitoring unit 11 illustrated in FIG. 10 includes a demultiplexer, the polarization monitoring unit 11 includes the integrated polarizing plate array 21, the PD array 22, the ND converter 23, and the processor 24, similarly as illustrated in FIG. 9. In this case, the operation of the polarization monitoring unit 11 is basically similar to the operation described with reference to FIG. 9.

FIGS. 11A and 11B illustrate exemplary embodiments of the polarization monitoring unit 11 used in the configuration illustrated in FIG. 10. In FIG. 11A, the polarization monitoring unit 11 includes a tunable filter 25, an integrated polarizing plate 26, and a PD element 27. The tunable filter 25 sequentially extracts the wavelength components λ1 to λn in accordance with a time-division multiplexing method. Preferably, the tunable filter 25 is capable of operating at high speed and has a narrow bandwidth of a few GHz. Therefore, the tunable filter 25 is realized by, for example, an etalon filter formed by EO (Electro-Optical) crystal. The integrated polarizing plate 26 generates the above-described four polarizations of the wavelength components extracted by the tunable filter 25. The PD element 27 converts the four polarizations obtained by the integrated polarizing plate 26 into electrical signals. The processor 24 calculates the Stokes parameters for each of the wavelength components, as described above. Accordingly, there is no need for a demultiplexer. Further, the light receiving circuit does not include an array element. Therefore, the cost of the light receiving circuit is reduced.

FIG. 11B illustrates the polarization monitoring unit 11 including a rotatable wave plate 28, a polarizing beam splitter (PBS) 29, a demultiplexer 30, and a PD array 22. The rotatable wave plate 28 is realized by, for example, the combination of two quarter-wave plates formed by ferroelectric liquid crystal and capable of switching the orientations. The rotatable wave plate 28 may be capable of performing a high-speed response in the order of microseconds. Further, the angle of rotation of the rotatable wave plate 28 is controlled to sequentially generate the above-described four polarizations. As described above, the processor 24 calculates the Stokes parameters for each of the wavelength components. Accordingly, it is possible to monitor the respective states of polarization of the wavelength components without providing an integrated polarizing plate or an integrated polarizing plate array.

Figure 12:
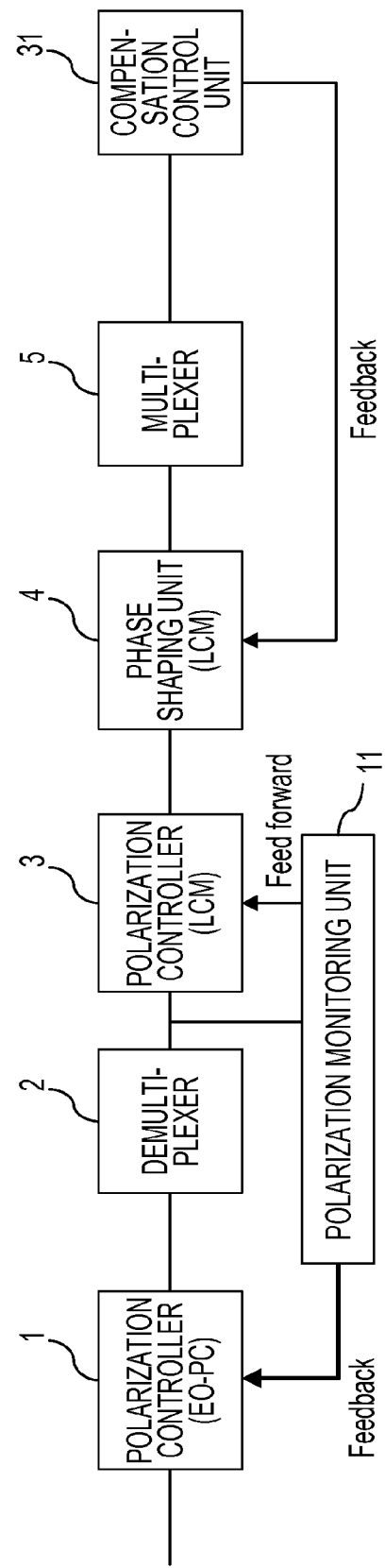
FIG. 12 illustrates a control system of the polarization mode dispersion compensator according to the first embodiment.

FIG. 12 illustrates a control system of the polarization mode dispersion compensator 100 according to the first embodiment. It is assumed herein that the light output from the demultiplexer 2 is divided and guided to the polarization monitoring unit 11. Further, in FIG. 12, an optical path extending from the demultiplexer 2 to the multiplexer 5 is illustrated in the form of one line. The spatially separated wavelength components λ1 to λn are transmitted in the free space.

As described above, the polarization monitoring unit 11 detects the respective states of polarization of the wavelength components λ1 to λn. That is, the polarization monitoring unit 11 calculates the Stokes parameters of the wavelength components λ1 to λn with a predetermined period. In this case, the period of calculating the Stokes parameters is preferably 1 ms or less. Further, based on the calculated Stokes parameters, the polarization monitoring unit 11 controls the polarization controllers 1 and 3.

To bring the polarization of a certain wavelength component (e.g., the central wavelength component λc) included in the spectrum of the input optical signal into a preset first target state of polarization, the polarization controller 1 collectively controls the states of polarization of the optical signal. That is, the polarization monitoring unit 11 controls the polarization controller 1 such that the Stokes parameters of the central wavelength of the optical signal represent the first target state of polarization. In this case, with the use of a dithering method, for example, the polarization monitoring unit 11 performs a feedback control of the drive voltage applied to the polarization controller 1.

The polarization controller 3 controls the respective polarizations of the wavelength components λ1 to λn in the same state of polarization. That is, the polarization monitoring unit 11 controls the matrix phase modulation devices of the polarization controller 3 such that each of the Stokes parameters of the wavelength components λ1 to λn of the optical signal represents a second target state of polarization. In this case, for example, the polarization monitoring unit 11 controls, by feed-forwarding, the respective voltages applied to the liquid crystal modulation devices of the polarization controller 3. The first and second target states of polarization may be the same as or different from each other.

A compensation control unit 31 may include includes light receiving elements, an ND converter, and a processor (not shown). The light receiving elements are photodiodes, for example, and convert the optical signals output from the multiplexer 5 into electrical signals. The A/D converter converts the signals output from the light receiving elements into digital data. The digital data represents the output signal from the polarization mode dispersion compensator 100. Further, with the use of the digital data, the processor controls the phase shaping unit 4 to compensate for the frequency dependence. In this case, the compensation control unit 31 performs, for example, a feedback control of the respective voltages applied to the liquid crystal modulation devices of the phase shaping unit 4. The function of the processor used by the compensation control unit 31 may be provided by the above-described processor 24.

The phase shaping unit 4 adjusts the respective phases of the wavelength components in accordance with the control of the compensation control unit 31. Herein, the frequency dependence of the phase depends on the polarization mode dispersion in the transmission line. Therefore, with the use of the GS (Gerchberg-Saxton) algorithm, for example, the compensation control unit 31 monitors the time waveform of the output signal from the polarization mode dispersion compensator 100, and controls the phase shaping unit 4 to optimize the time waveform (e.g., reduce the pulse width). The compensation control unit 31 may be configured to monitor the time waveform by using an auto-correlation interferometer (auto-correlator). Further, the compensation control unit 31 may be configured to monitor the time waveform by using an interferometer in a frequency space called FROG (Frequency-Resolved Optical Gating).

As the procedure of monitoring and controlling the phase, the short pulse laser monitoring technique described in the following document can be used, for example: M. Akbulut et al., "Broadband All-Order Polarization Mode Dispersion Compensation Using Liquid-Crystal Modulator Array," Journal of Lightwave Technology, Vol. 24, No. 1, pages 251 to 261, 2006.

The GS algorithm is described in, for example, the following document: A. Rundquist et al., "Pulse Shaping with the Gerchberg-Saxton algorithm," J. Opt. Soc. Am. B/Vol. 19, No. 10, pages 2468 to 2478, October 2002.

The FROG method is described in, for example, the following document: H. Miao et al., "Broadband All-Order Polarization Mode Dispersion Compensation," OFC2007, OTuN2 2007.

Figure 13:
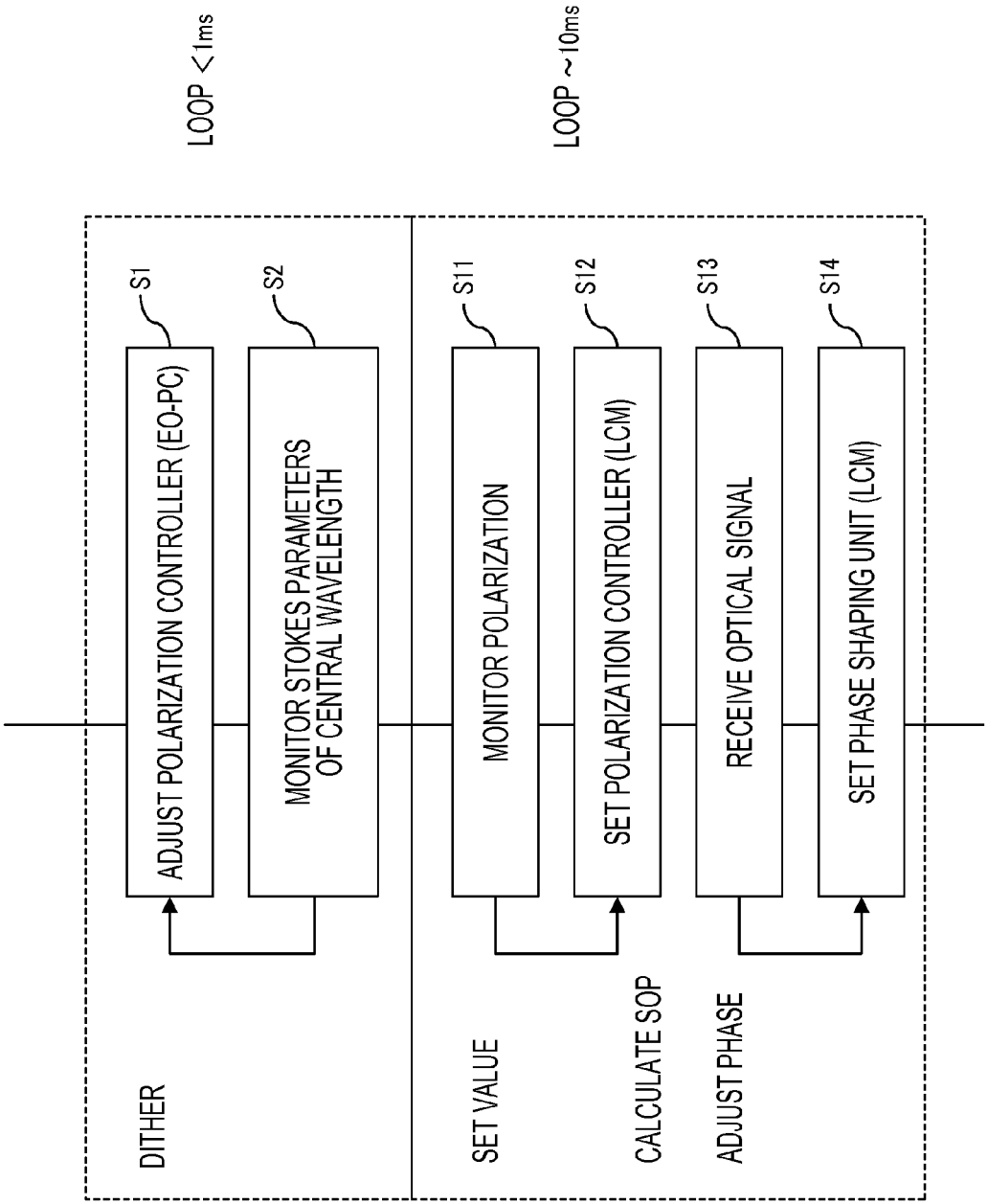
FIG. 13 illustrates a method of controlling the polarization mode dispersion compensator according to the first embodiment.

FIG. 13 illustrates a method of controlling the polarization mode dispersion compensator 100 according to the first embodiment. The processes of the flowchart may bee performed by the processors included in the polarization monitoring unit 11 and the compensation control unit 31.

Operations S1 and S2 are repeatedly performed with a period required to sufficiently follow the fluctuation in the state of polarization in the transmission line (a period shorter than 1 ms in this case). In this embodiment, the polarization monitoring unit 11 monitors the Stokes parameters of the central wavelength component $\lambda c$ of the optical signal. The polarization monitoring unit 11 adjusts the polarization controller 1 such that the Stokes parameters represent the target state of polarization.

Operations S11 to S14 are repeatedly performed with a period longer than the response speed of the liquid crystal modulation devices (e.g., 1 to 100 ms). It is assumed herein that the operations are performed with a period of 10 ms, for example. At Operation S11, the polarization monitoring unit 11 monitors the respective states of polarization of the wavelength components $\lambda 1$ to $\lambda n$ of the optical signal. If the Stokes parameters of the wavelength components $\lambda 1$ to $\lambda n$ are calculated at Operation S2, the result of the calculation may be used at Operation S11. Then, at Operation S12, the polarization monitoring unit 11 controls the liquid crystal modulation devices of the polarization controller 3 such that the respective states of polarization of the wavelength components $\lambda 1$ to $\lambda n$ are equal to one another.

At Operation S13, the compensation control unit 31 monitors the time waveform of the optical signal output from the polarization mode dispersion compensator 100. The compensation control unit 31 controls the liquid crystal modulation devices of the phase shaping unit 4 to optimize the time waveform. The period of performing Operations S11 and S12 and the period of performing Operations S13 and S14 may be the same as or different from each other.

The polarization monitoring unit 11 may be configured to detect only the state of polarization of the central wavelength component $\lambda c$ with the control period of the polarization controller 1, and to detect the respective states of polarization of all wavelength components $\lambda 1$ to $\lambda n$ with the control period of the polarization controller 3. In this case, it is possible to reduce the calculations performed to detect the states of polarization (the calculations performed to calculate the Stokes parameters in this embodiment). Alternatively, the polarization monitoring unit 11 may detect the respective states of polarization of all wavelength components $\lambda 1$ to $\lambda n$ with the control period of the polarization controller 1. In this case, the detection result of the central wavelength component $\lambda c$ is used to control the polarization controller 1.

Figure 14:
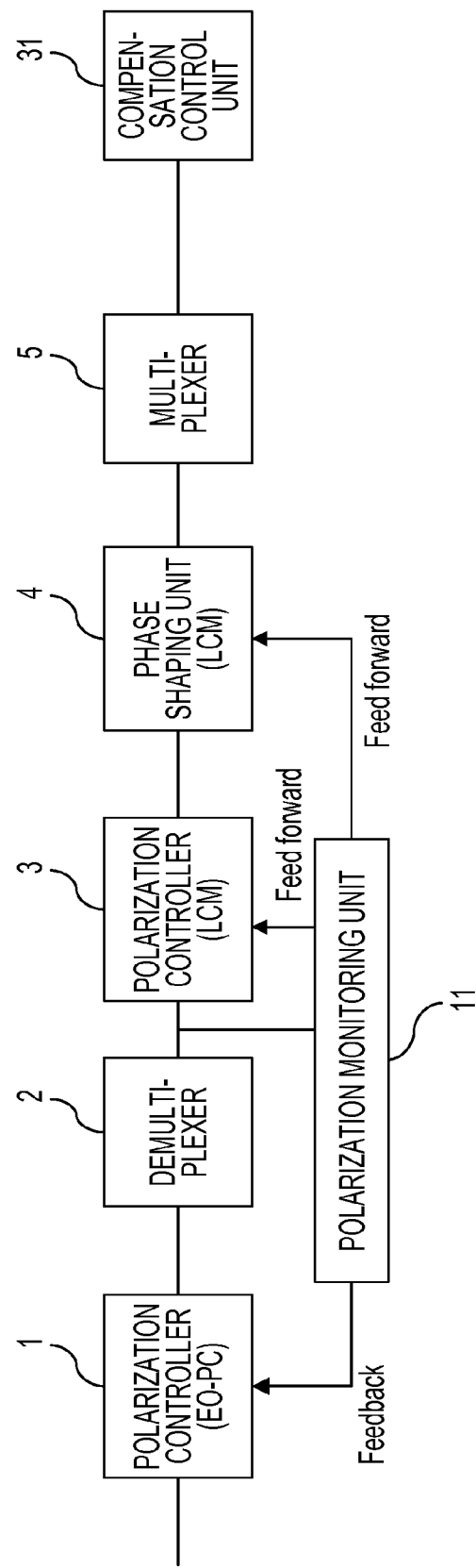
FIG. 14 illustrates another control system of the polarization mode dispersion compensator according to the first embodiment.

FIG. 14 illustrates a control system of the polarization mode dispersion compensator 100 according to the first embodiment. This control system may be used when the polarization mode dispersions in the transmission line are uniformly distributed, for example. When the polarization mode dispersions in the transmission line are uniformly distributed, it is possible to calculate the respective polarization mode dispersions of the wavelength components based on the respective states of polarization (i.e., the Stokes parameters) of the wavelength components, and to compensate for the phase difference in accordance with the result of the calculation. In this configuration, therefore, the polarization monitoring unit 11 controls the liquid crystal modulation devices of the phase shaping unit 4 based on the Stokes parameters of the wavelength components.

Figure 15:
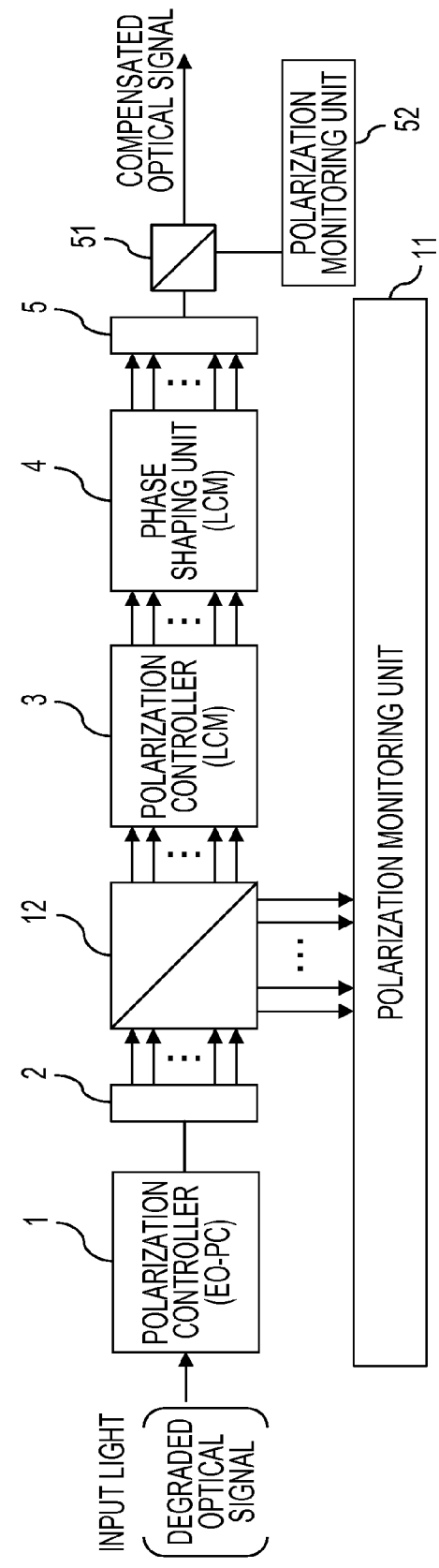
FIG. 15 illustrates a configuration of a polarization mode dispersion compensator according to a second embodiment.

FIG. 15 illustrates a configuration of a polarization mode dispersion compensator according to a second embodiment. A polarization mode dispersion compensator 200 according to a second embodiment includes an optical splitter 51 and a polarization monitoring unit 52. The optical splitter 51 divides the multiplexed optical signal, and guides a part of the divided optical signal to the polarization monitoring unit 52. The polarization monitoring unit 52 monitors the state of polarization of the multiplexed optical signal. The polarization monitoring unit 52 may be configured to monitor the state of polarization of the optical signal separated from the optical path extending between the polarization controller 1 and the demultiplexer 2.

If the polarization in the transmission line quickly fluctuates, the polarization controller 1 is required to have an adjustment speed of approximately a few hundred μs in some cases. Meanwhile, the polarization controller 1 is controlled based on the state of polarization of a wavelength component (e.g., the central wavelength) of the optical signal. Further, in the second embodiment, the state of polarization may be detected by a simpler configuration.

Figure 16A:
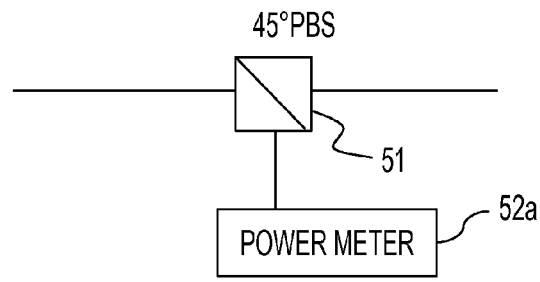
FIGS. 16A to 16C illustrate embodiments of a polarization monitoring unit.

As illustrated in FIG. 16A, for example an optical power meter 52a may serve as a polarization monitoring unit. In this case, the optical splitter 51 is a polarizing beam splitter (PBS). Herein, if the light output from the polarization mode dispersion compensator 200 is controlled in 45° linear polarization, for example, the optical splitter 51 allows a 45° polarization component to pass therethrough, and guides the other polarization components to the optical power meter 52a. In this case, if feedback is performed to minimize the optical power detected by the optical power meter 52a, the polarization controller 1 is controlled to the optimum point.

Figure 16B:
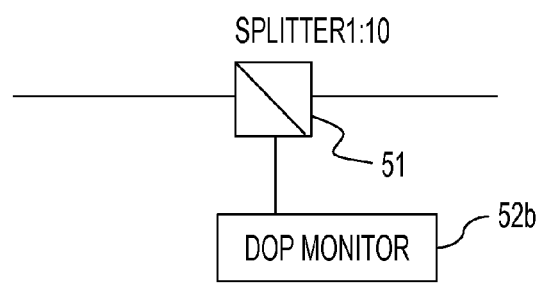

As illustrated in FIG. 16B, a DOP (Degree Of Polarization) monitor 52b may serve as a polarization monitoring unit. In this case, the optical splitter 51 divides the output light, and guides a part of the divided output light to the DOP monitor 52b. Based on the result of the monitoring by the DOP monitor 52b, the Stokes parameters can be calculated. In this case, the polarization controller 1 is controlled such that the calculated Stokes parameters represent the target state of polarization. Alternatively, a feedback control may be performed to maximize the DOP value. As a single-frequency DOP monitor, a configuration capable of performing a high-speed operation in approximately 10 μs has been known.

Figure 16C:
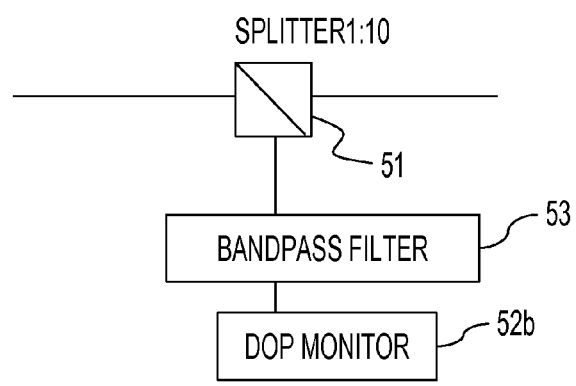

As illustrated in FIG. 16C, a bandpass filter 53 may be provided between the optical splitter 51 and the DOP monitor 52b. The bandpass filter 53 extracts the central wavelength component $\lambda c$ of the optical signal. According to this configuration, it is possible to accurately detect the state of polarization of the central wavelength component λc of the optical signal.

Normally, however, the spectrum of the optical signal has the highest intensity in the central wavelength, as illustrated in FIG. 5, for example. Therefore, even a configuration not including a bandpass filter, as illustrated in FIG. 16B, practically detects the state of polarization of a portion near the central wavelength of the optical signal.

Figure 17A:
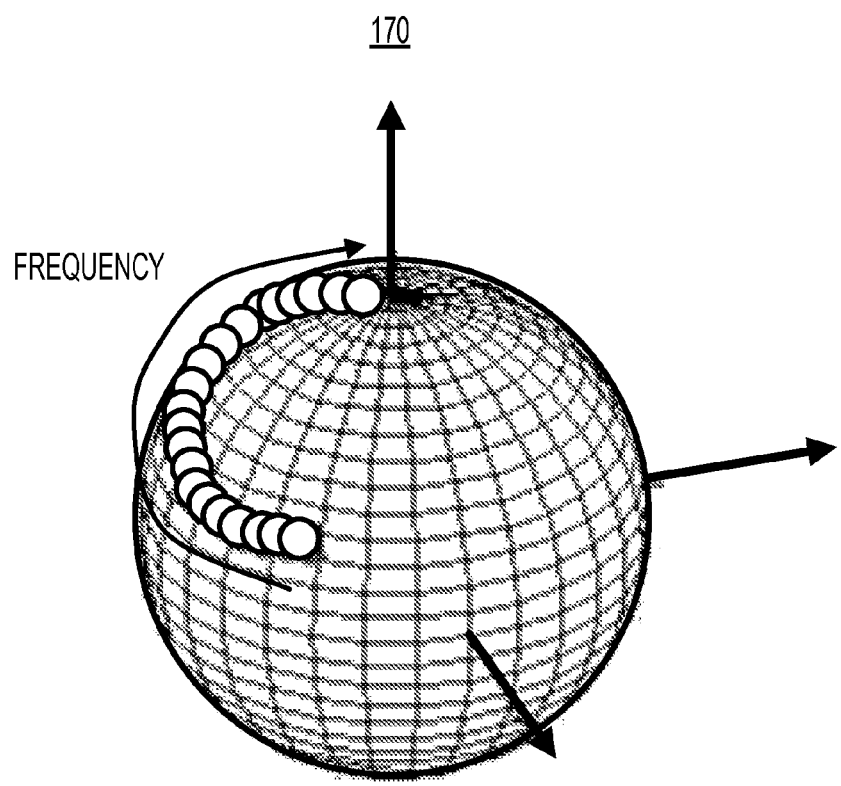
FIGS. 17A and 17B illustrate states of polarization of light subjected to polarization mode dispersion, as displayed on the Poincare sphere.
Figure 17B:
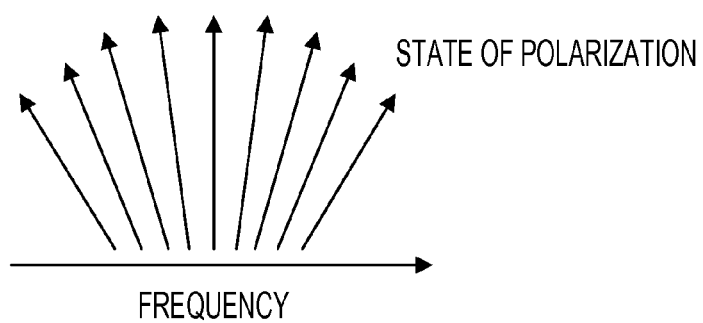

FIGS. 17A and 17B illustrate a simulation result representing the states of polarization of light subjected to the polarization mode dispersion. The states of polarization may be displayed on the Poincare sphere 170. In this simulation, the frequency spectrum width of the input signal is 80 GHz, and the average DGD of the transmission line is 6 ps. Further, the open circles represent the respective states of polarization of the frequency components (wavelength components).

The respective states of polarization of the frequencies in the modulation spectrum are not completely random but correlated with one another even after subjected to the polarization mode dispersion. That is, the states of polarization of the output light are sequentially distributed in accordance with the frequency, and mutually adjacent frequency components have mutually close states of polarization.

Figure 18:
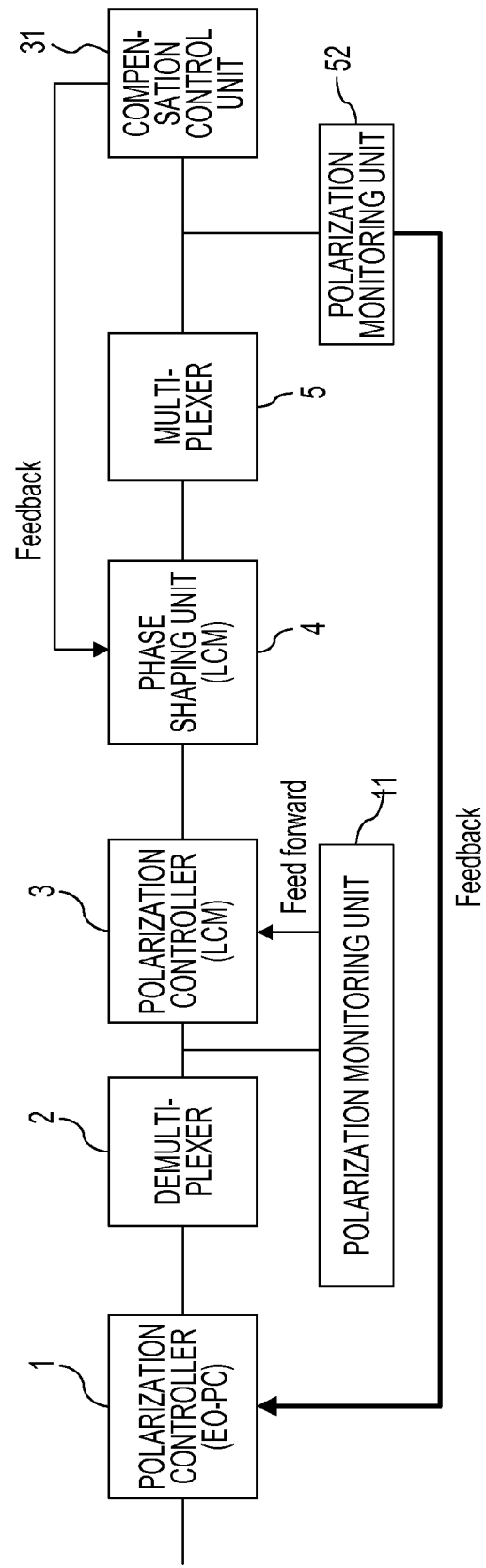
FIG. 18 illustrates a control system of the polarization mode dispersion compensator according to the second embodiment.

FIG. 18 illustrates a control system of the polarization mode dispersion compensator 200 according to the second embodiment. In the second embodiment, the polarization controller 1 is controlled based on the state of polarization of the optical signal subjected to the multiplexing or the optical signal prior to the demultiplexing. However, the procedure of the control substantially follows FIG. 13.

Figure 19:
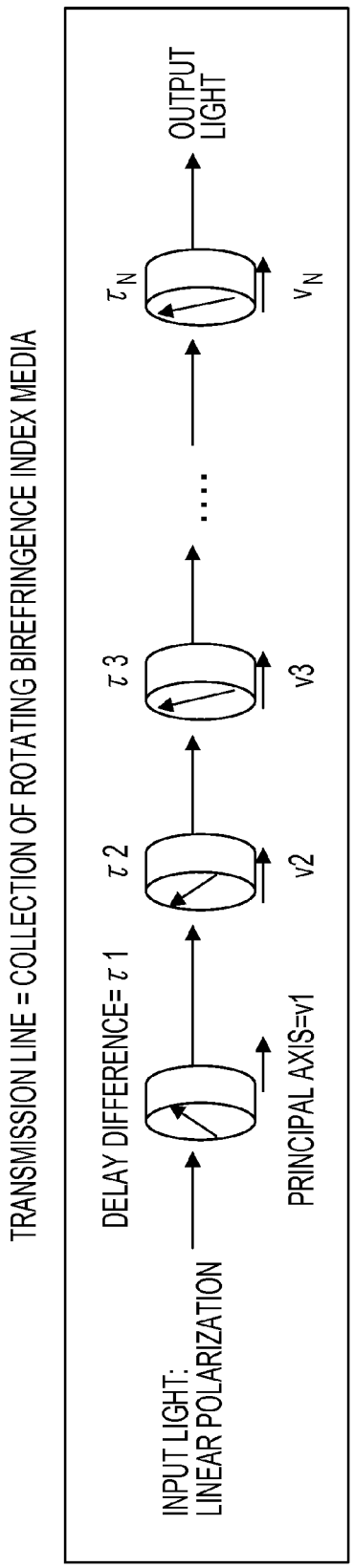
FIG. 19 illustrates a simulation model.

FIG. 19 illustrates a simulation model. In the simulation model, the polarization mode dispersion in the transmission line is emulated by a plurality of rotating birefringence index elements i (i=1 to N). The orientation and the DGD of the birefringence index elements i are represented as "vector vi" and "τi," respectively. Further, each of the birefringence index elements is assumed to rotate at random by a minute angle in the time domain.

Figure 20:
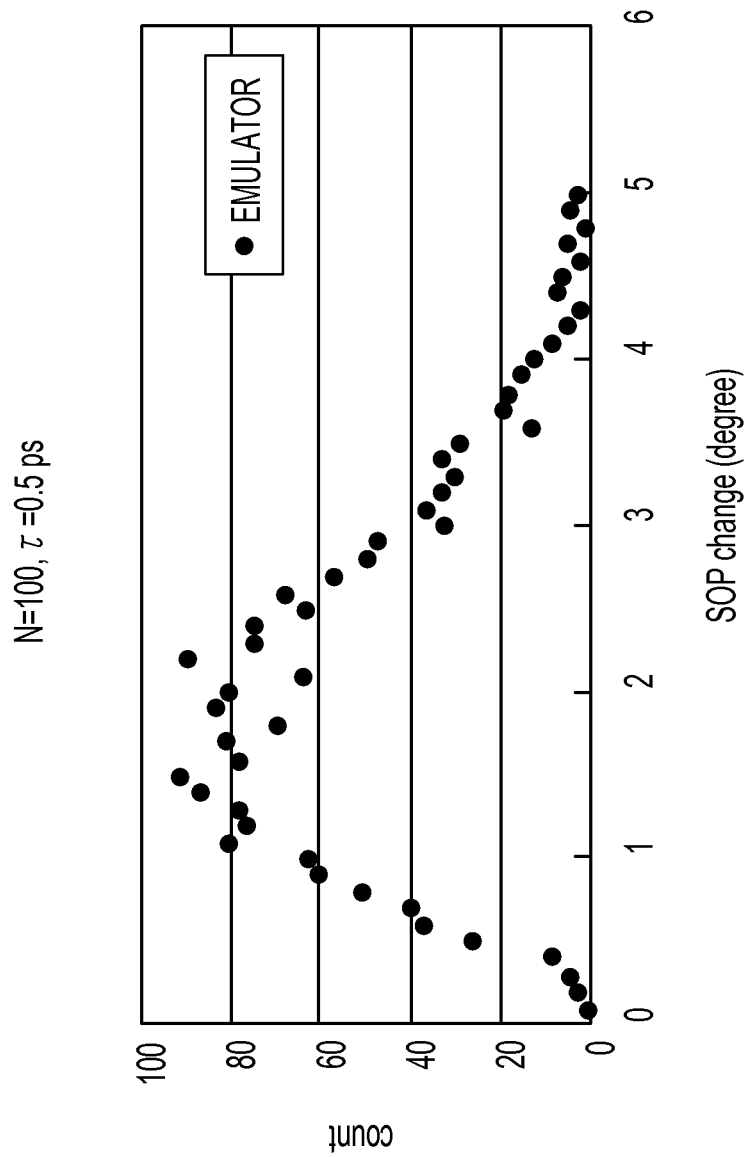
FIG. 20 illustrates the distribution of angles of change in the state of polarization.

FIG. 20 illustrates the distribution of angles of change in the state of polarization. This simulation result is obtained when the DGD of the birefringence index elements is 0.5 ps and the value N is 100 in the model illustrated in FIG. 19. The graph illustrated in FIG. 20 represents the frequency of occurrence of angles of change in the state of polarization (SOP) after the lapse of a predetermined time. According to this simulation, there is a high probability of a change in the state of polarization by an angle of approximately 2°. Herein, the above-described non-patent document by C. Xie et al. indicates that the SOP changes by an angle of 2° to 3° in 1 ms in a transmission line, in which the state of polarization quickly fluctuates, and that a polarization control needs to be performed within 1 ms. That is, the simulation illustrated in FIG. 20 is considered to represent the state in a transmission line, in which the SOP quickly fluctuates, after the lapse of 1 ms. In the following, therefore, the effects of the configurations according to the embodiments will be estimated based on this state.

Figure 21A:
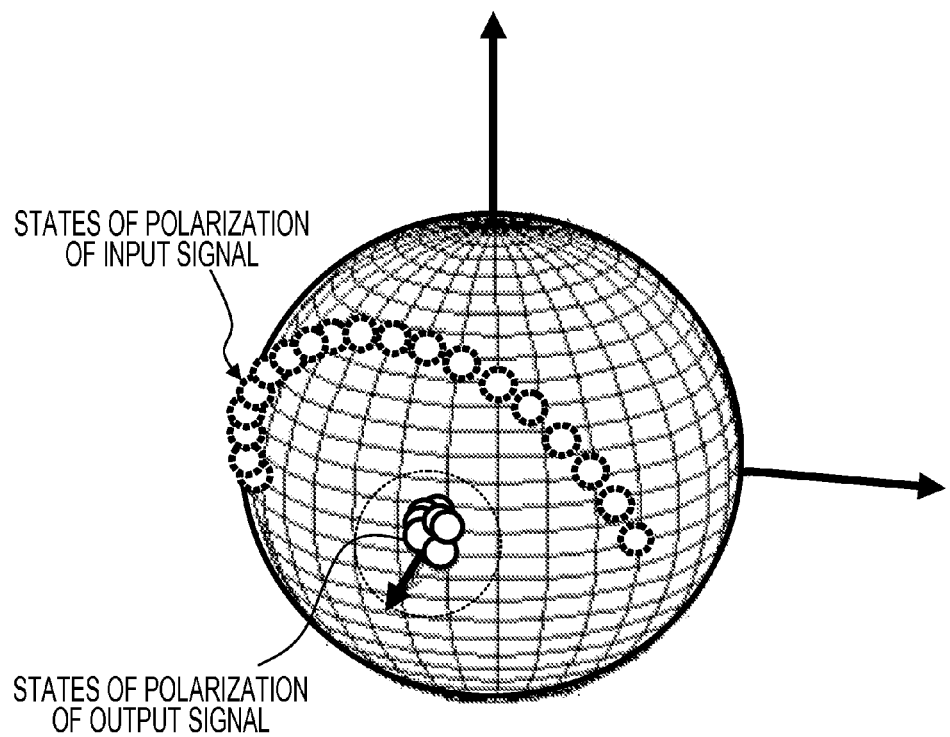
FIGS. 21A and 21B illustrate a simulation result of the states of polarization.
Figure 21B:
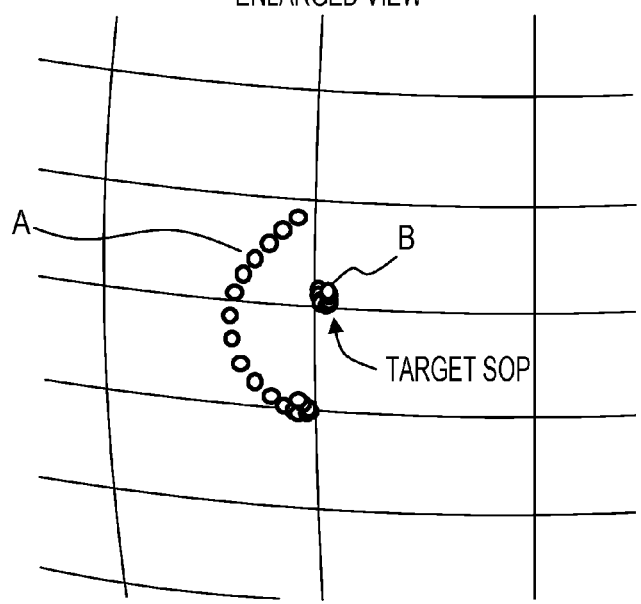

FIGS. 21A and 21B illustrate a simulation result of the states of polarization. Herein, the states of polarization of the optical signal input to the polarization mode dispersion compensator and the states of polarization of the optical signal, the polarization of which is controlled by the polarization controllers 1 and 3, are displayed on the Poincare sphere. Herein, in the input optical signal, the respective states of polarization of the wavelength components are substantially different from one other due to the polarization mode dispersion in the transmission line. The polarization controller 1 is assumed to control the state of polarization of the input optical signal with a period shorter than 1 ms, and the polarization controller 3 is assumed to control the respective states of polarization of the wavelength components with a period of 3 ms.

If the polarization mode dispersion compensator does not include the polarization controller 1, the range of fluctuation in the respective states of polarization of the wavelength components λ1 to λn is approximately 5.5° (characteristic A). According to the polarization mode dispersion compensators according to exemplary e embodiments, the range of fluctuation in the respective states of polarization of the wavelength components λ1 to λn is approximately 0.8° (characteristic B).

A polarization mode dispersion compensator according to an embodiment is capable of reducing the range of fluctuation in the state of polarization depending on the wavelength, and thus capable of sufficiently compensating for the first- and higher-order polarization mode dispersion.

Figure 22:
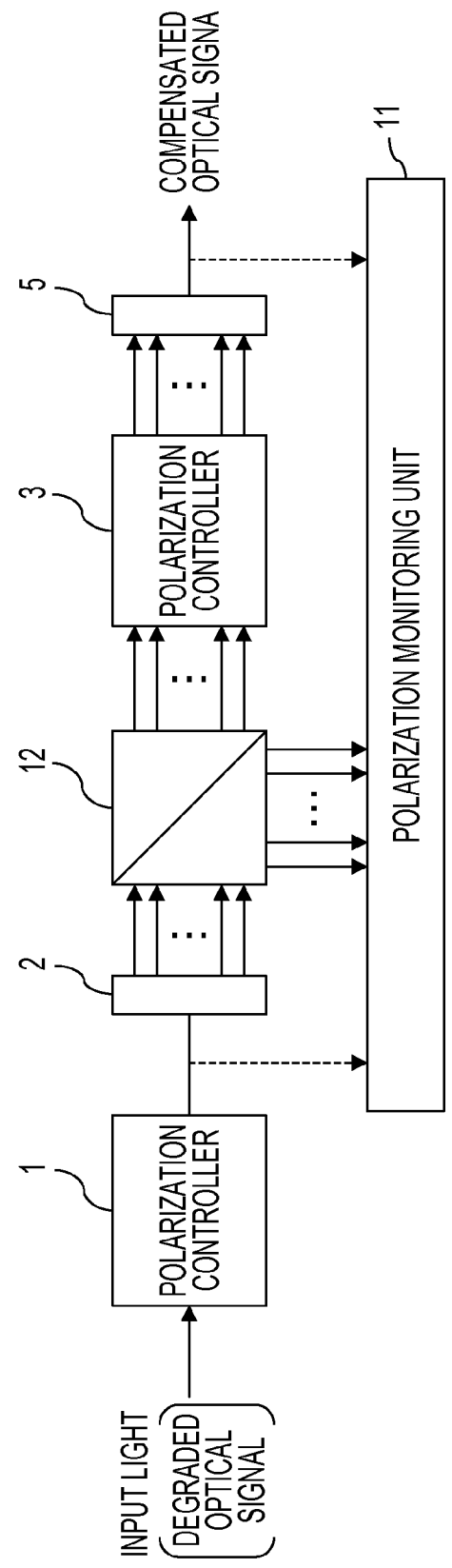
FIG. 22 illustrates a configuration of a polarization controller according to an embodiment.

FIG. 22 illustrates a polarization controller according to an embodiment. A polarization controller 300 according to an embodiment includes the polarization controller 1, the demultiplexer 2, the polarization controller 3, the multiplexer 5, the polarization monitoring unit 11, and the optical splitter 12. The configurations and operations of these circuit components 1 to 3, 5, 11, and 12 are substantially similar to the other configurations and operations described. Herein, the polarization controller 300 does not include the phase shaping unit 4. That is, the polarization controller 300 equalizes the respective states of polarization of the wavelength components λ1 to λn, and thereafter multiplexes and outputs the wavelength components λ1 to λn.

Figure 23:
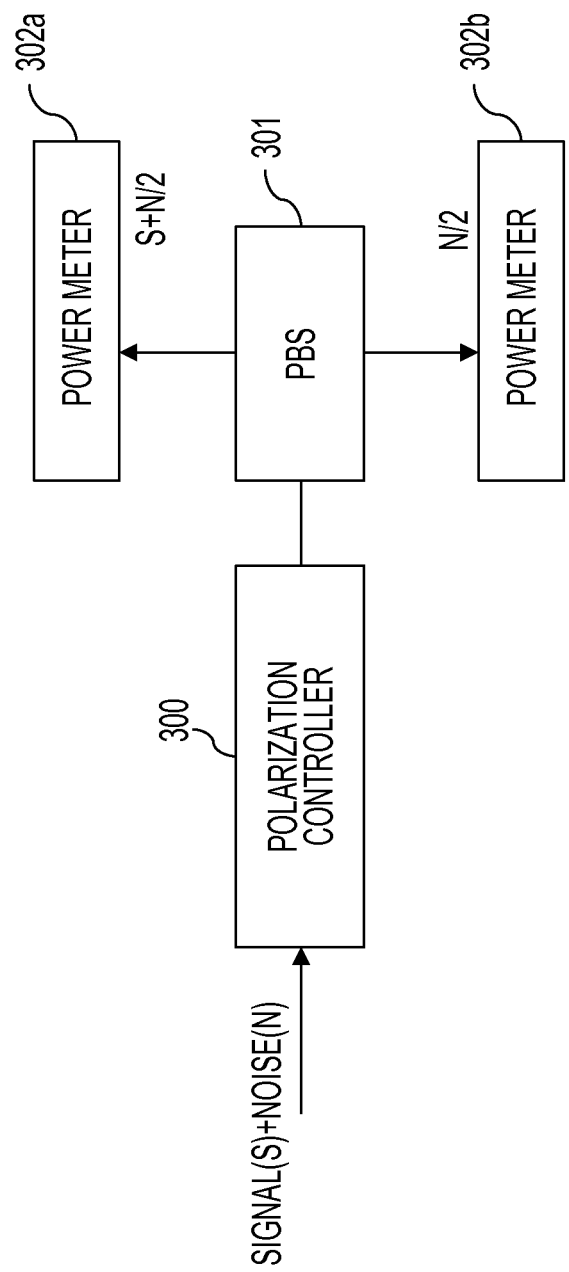
FIG. 23 illustrates an application example of the polarization controller according to the embodiment.

FIG. 23 illustrates an application example of the polarization controller 300 according to the embodiment. In this embodiment, the polarization controller 300 is used to form an OSNR (Optical Signal-to-Noise Ratio) monitoring circuit. The OSNR monitoring circuit includes the polarization controller 300, a polarizing beam splitter (PBS) 301, and optical power meters 302a and 302b.

The polarization controller 300 equalizes the respective polarizations of the wavelength components to an angle of 45°, for example, and thereafter multiplexes and outputs the wavelength components. The polarizing beam splitter 301 guides the 45° polarized light to the optical power meter 302a, and guides the other optical components to the optical power meter 302b. The optical power meter 302a detects the power represented as "S+N/2," and the optical power meter 302b detects the power represented as "N/2." Herein, "S" represents the power of signal light, and "N" represents the power of a noise component. It is therefore possible to calculate the OSNR by using the optical power meters 302a and 320b.

If the polarization in a transmission line includes different states of polarization in the wavelength components of the modulation spectrum due to the polarization mode dispersion or the like, the noise component is not completely separated solely by polarizers. This issue may be addressed by the use of a bandpass filter having a narrow bandwidth of approximately a few GHz, for example. However, filters of this type are usually expensive.

In the OSNR monitor including the polarization controller according to the embodiment, the respective polarizations of the wavelength components of the optical signal are accurately equalized to one another. It is therefore possible to separate the noise component, which is completely random polarization. With the use of the OSNR monitor, therefore, it is possible to accurately measure the OSNR, even if the respective polarizations of the wavelength components of the optical signal fluctuate fast, as in an actual transmission line.

Further, the polarization controller 300 according to the embodiment is also applicable to, for example, a receiver which separates a polarization multiplex signal in a polarization multiplex transmission system. Therefore, it is possible to accurately separate the polarization multiplex signal, and thus to reduce the bit error ratio.

According to an exemplary embodiment, it is possible to accurately compensate for the polarization mode dispersion in a transmission line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A polarization controller comprising:
a first polarization controller to control a state of polarization of an input modulated light such that a part of the wavelength components of the input light is in a first state of polarization;
a demultiplexer to demultiplex the light output from the first polarization controller into a plurality of wavelength components;
a second polarization controller including liquid crystal modulation devices to control the plurality of wavelength components to be in a second state of polarization; and
a multiplexer to multiplex the plurality of wavelength components output from the second polarization controller.

2. The polarization controller according to claim 1, wherein the first polarization controller collectively controls the respective states of polarization of the wavelength components of the input light by using a crystal having the electro-optical effect, a response speed of the first polarization controller being faster than a response speed of the second polarization controller.

3. The polarization controller according to claim 1, further comprising:
a monitor to monitor the Stokes parameters of the plurality of wavelength components,
wherein the first polarization controller controls the state of polarization of the input light based on the Stokes parameters of one of the plurality of wavelength components, and
wherein the second polarization controller controls the respective states of polarization of the plurality of wavelength components based on the Stokes parameters of the plurality of wavelength components.

4. The polarization controller according to claim 3, wherein the first polarization controller controls the state of polarization of the input light based on the Stokes parameters of the central wavelength of the input light.

5. The polarization controller according to claim 3, further comprising:
an optical splitter to guide the plurality of wavelength components to the monitor,
wherein the optical splitter is provided between the demultiplexer and the second polarization controller.

6. The polarization controller according to claim 3, further comprising:
an optical splitter to guide the input light to the monitor,
wherein the optical splitter is provided on the input side of the demultiplexer.

7. The polarization controller according to claim 1, further comprising:
a first monitor to monitor the Stokes parameters of the plurality of wavelength components;
an optical splitter provided on the input side of the demultiplexer or the output side of the multiplexer; and
a second monitor to monitor the state of polarization of the light divided by the optical splitter,
wherein the first polarization controller controls the state of polarization of the input light based on the state of polarization detected by the second monitor, and
wherein the second polarization controller controls the respective states of polarization of the plurality of wavelength components based on the Stokes parameters of the plurality of wavelength components obtained by the first monitor.

8. The polarization controller according to claim 2, further comprising:
a first monitor to monitor the Stokes parameters of the plurality of wavelength components;
an optical splitter provided on the input side of the demultiplexer or the output side of the multiplexer; and
a second monitor to monitor the state of polarization of the light divided by the optical splitter,
wherein the first polarization controller controls the state of polarization of the input light based on the state of polarization detected by the second monitor, and
wherein the second polarization controller controls the respective states of polarization of the plurality of wavelength components based on the Stokes parameters of the plurality of wavelength components obtained by the first monitor.

9. A polarization mode dispersion compensator comprising:
a first polarization controller to control a state of polarization of an input modulated light such that a part of the wavelength components of the input light is in a first state of polarization;
a demultiplexer to demultiplex the light output from the first polarization controller into a plurality of wavelength components;
a second polarization controller including liquid crystal modulation devices to control the plurality of wavelength components to be in a second state of polarization;
a phase controller to control the respective phases of the wavelength components, the respective states of polarization of which are controlled by the second polarization controller; and a multiplexer to multiplex the plurality of wavelength components output from the phase controller.

10. A polarization control method comprising:
causing a first polarization controller to control a state of polarization of an input modulated light such that a part of the wavelength components of the input light is in a first state of polarization;
demultiplexing, by a demultiplexer, the light output from the first polarization controller into a plurality of wavelength components;
causing a second polarization controller including liquid crystal modulation devices to control the plurality of wavelength components to be in a second state of polarization; and
multiplexing, by a multiplexer, the plurality of wavelength components output from the second polarization controller,
wherein the demultiplexer and the multiplexer are separate.

11. The polarization control method according to claim 10, wherein the first polarization controller controls the state of polarization of the input light with a first period, and
wherein the second polarization controller controls the respective states of polarization of the plurality of wavelength components with a second period longer than the first period.

12. The polarization mode dispersion compensator according to claim 9, wherein the first polarization controller collectively controls the respective states of polarization of the wavelength components of the input light by using the electro-optical effect.

13. The polarization control method according to claim 10, wherein the first polarization controller collectively controls the respective states of polarization of the wavelength components of the input light by using the electro-optical effect.

* * * * *